United States Patent
Brunel et al.

(10) Patent No.: US 7,817,602 B2
(45) Date of Patent: Oct. 19, 2010

(54) TRANSMISSION METHOD IN A WIRELESS TELECOMMUNICATION SYSTEM INCLUDING AT LEAST A BASE STATION INTENDED TO COMMUNICATE WITH TERMINALS

(75) Inventors: Loic Brunel, Rennes Cedex (FR); David Mottier, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 344 days.

(21) Appl. No.: 11/924,076

(22) Filed: Oct. 25, 2007

(65) Prior Publication Data
US 2008/0101262 A1    May 1, 2008

(30) Foreign Application Priority Data
Oct. 30, 2006    (EP)    .................................. 06022610

(51) Int. Cl.
*H04B 1/04*    (2006.01)
(52) U.S. Cl. .................... 370/331; 370/508; 370/537; 455/121; 455/436
(58) Field of Classification Search .................. None
See application file for complete search history.

(56) References Cited

U.S. PATENT DOCUMENTS 7,471,932 B2 * 12/2008 Wu et al. ...................... 455/91

2007/0183442 A1 * 8/2007 Shibata ........................ 370/437

FOREIGN PATENT DOCUMENTS

| EP | 0 571 005 A2 | 11/1993 |
| EP | 1 511 190 A1 | 3/2005 |

* cited by examiner

*Primary Examiner*—Chi H. Pham
*Assistant Examiner*—Shick Hom
(74) *Attorney, Agent, or Firm*—Oblon, Spivak, McClelland, Maier & Neustadt, L.L.P.

(57) ABSTRACT

The present invention concerns a transmission method in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to at least two terminals, wherein the transfer of at least one supplementary symbol between the base station and at least one terminal that can receive or transmit the at least one supplementary symbol during the time delay is enabled. At least part of each symbol comprised in the sub frame are transferred according to a first transmission power coefficients and at least at least one supplementary symbol is transferred according to second transmission power coefficients.

21 Claims, 9 Drawing Sheets

| | 1356 | 1355 | 1351 | 1352 | 1353 | 1354 |
|---|---|---|---|---|---|---|
| 1301 | | | TE1 | TE1 | TE1 | TE1 |
| 1302 | | | TE1 | TE1 | TE1 | TE1 |
| 1303 | | | TE1 | TE1 | TE1 | TE1 |
| 1304 | | TE2 | TE2 | TE2 | TE2 | TE2 |
| 1305 | | TE2 | TE2 | TE2 | TE2 | TE2 |
| 1306 | | TE2 | TE2 | TE2 | TE2 | TE2 |
| 1307 | TE3 | TE3 | TE3 | TE3 | TE3 | TE3 |
| 1308 | TE3 | TE3 | TE3 | TE3 | TE3 | TE3 |
| 1309 | TE3 | TE3 | TE3 | TE3 | TE3 | TE3 |
| 1310 | | | TE1 | TE1 | TE1 | TE1 |
| 1311 | | | TE1 | TE1 | TE1 | TE1 |
| 1312 | | | TE1 | TE1 | TE1 | TE1 |
Fig. 10d
| | 1451 | 1452 | 1453 | 1454 | 1455 | 1456 |
|---|---|---|---|---|---|---|
| 1401 | TE1 | TE1 | TE1 | TE1 | TE2 | TE3 |
| 1402 | TE1 | TE1 | TE1 | TE1 | TE2 | TE3 |
| 1403 | TE1 | TE1 | TE1 | TE1 | TE2 | TE3 |
| 1404 | TE2 | TE2 | TE2 | TE2 | TE2 | TE3 |
| 1405 | TE2 | TE2 | TE2 | TE2 | TE2 | TE3 |
| 1406 | TE2 | TE2 | TE2 | TE2 | TE2 | TE3 |
| 1407 | TE2 | TE2 | TE2 | TE2 | TE3 | TE3 |
| 1408 | TE2 | TE2 | TE2 | TE2 | TE3 | TE3 |
| 1409 | TE2 | TE2 | TE2 | TE2 | TE3 | TE3 |
| 1410 | TE1 | TE1 | TE1 | TE1 | TE3 | TE3 |
| 1411 | TE1 | TE1 | TE1 | TE1 | TE3 | TE3 |
| 1412 | TE1 | TE1 | TE1 | TE1 | TE3 | TE3 |
Fig. 10e
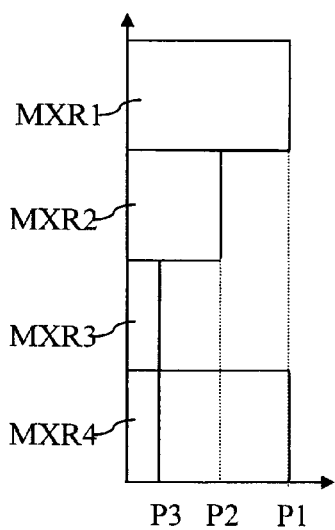
Fig. 11a
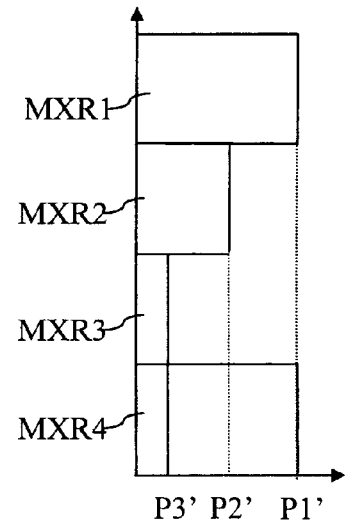
Fig. 11b

TRANSMISSION METHOD IN A WIRELESS TELECOMMUNICATION SYSTEM INCLUDING AT LEAST A BASE STATION INTENDED TO COMMUNICATE WITH TERMINALS

BACKGROUND OF THE INVENTION

The present invention relates generally to telecommunication systems and in particular, to transmission methods and devices in a wireless telecommunication system including at least a base station intended to communicate with terminals over bidirectional communication channels.

Note that wireless telecommunication systems include mobile telecommunication systems in which mobile terminals may move over long distances and sometimes quickly but also telecommunication systems in which the terminals are fixed or may only move over short distances relative to the base station which they are connected to and often very slowly.

FIG. 1 diagrammatically shows a wireless cellular telecommunication system serviced by plural base stations. In the FIG. 1 only one base station BTSa is depicted, the base station BTSa intends to communicate with at least one terminal, here three terminals TE1, TE2 and TE3, over wireless communication channels CH1 to CH3 respectively.

In the FIG. 1, the terminal TE1 is at a distance d1 from the base station BTSa, the terminal TE2 is at a distance d2 from the base station BTSa and the terminal TE3 is at a distance d3 from the base station BTSa. The area covered by a base station BTSa is generally called a cell 15a, the border of said cell being at a distance of the base station considered as maximal.

Each channel Chi, with i=1 to 3, is intended to support an uplink channel UL for carrying information from the terminal TEi to the base station BTSa and a downlink channel DLi for carrying information from the base station BTSa to the terminal TEi. Said information is enclosed within frames split into time slots or sub frames allocated either to the uplink channel ULi or to the downlink channel DLi.

The frame is for example of the type depicted in FIG. 4, i.e. of the HD/OFDM type (standing for Half Duplex/Orthogonal Frequency Division Multiplex/OFDM) either TDD/OFDM (Time Division Duplex/OFDM) or FDD/OFDM (Frequency Division Duplex). As it can be seen at FIG. 4, this frame is subdivided into an integer number L of time slots or sub frames TS1 to TSL that can be allocated either to the downlink channel DL or to the uplink channel UL. Furthermore, each sub frame TSj (j=1 to L) supports $q_j$ symbols s1 to $sq_j$ (here, for the sub frame TSj, $q_j$=4), called OFDM symbols, respectively carried by k orthogonal modulation frequencies f1 to fk.

Note that each of the OFDM symbols s1 to $sq_j$ in a sub frame TSj generally includes a cyclic prefix that is used to combat inter-symbol interference.

It must be understood that in a general case the number of symbols per sub frame can vary from a sub frame to another.

In relation with FIG. 5 let's consider the transmission at time te of $q_j$=four symbols s1 to s4 over the downlink channel DL by a base station BTSa. These symbols s1 to s4 are received by a terminal TE1 at the border of the considered cell 15a (at a distance d1 from the base station BTSa) at a time equal to te+RTD(d1)/2, where RTD(d1) is the Round Trip Delay for that terminal TE1 at said distance d1 from the base station BTSa. These symbols are processed by the terminal TE1 which then may transmit also symbols over the uplink channel UL. Before transmitting symbols over the uplink channel UL, a terminal TEi has to wait for a period of time, said Receive Transmit Switch time or simply switching time and referred to as RTS, in order to take into account the duration of hardware and software operations. For instance, this delay RTS is the maximum of the time needed by hardware equipments of the terminals TE to switch between reception and transmission modes and the time needed by hardware equipments of the base station BTSa to switch between transmission and reception modes. The symbols transmitted over the uplink channel UL are received at the base station BTSa at a time tr equal to te+RTD(d1)+RTS+$D_{DL}$, $D_{DL}$ being the total duration of the $q_j$ symbols. It can thus be seen that the base station BTSa has to wait for the reception of the symbols transmitted by a terminal TEi located at the border of the cell 15a in order to perform the processing thereof. The waiting time is called the Guard Period GP and must be equal at least to the round trip delay RTD(d1) plus the Receive Transmit Switch time RTS.

When a single terminal is involved in the present invention, it is named terminal TEi, with i=1 or 2 or 3 and so on up to the maximum number of terminals comprised in the coverage area of the Base station BTSa.

When at least two terminals are involved in the present invention, they are named terminals TE.

Guard periods GP between downlink channels DL and uplink channels UL can be seen on FIG. 4.

The base station BTSa determines a timing delay TD(d) for each of the terminals TE. The base station BTSa transfers symbols to terminals TE which may transfer in response symbols to the base station BTSa. These symbols are as example pilot symbols.

The timing delay is calculated using the following formula:
$TD(d)=tr-te-D_{DL}-RTD(d)=GP-RTD(d)$, where d is the distance between each terminal TEi and the base station BTSa.

From each timing delay, the base station BTSa determines the Timing Advance TA=GP−TD(d) for each terminal and transfers the Timing Advance to the correspondent terminal TEi.

Each terminal applies its Timing Advance value for the transmission of symbols over the uplink channel UL in such a manner that the transmitted symbols are received at the base station BTSa from terminals TE connected thereto at the same time tr.

The problem addressed by the telecommunication system afore described is related to a potential loss of resources resulting from the fact that during the guard period GP no information of any sort is transmitted or received at the base station.

In order to solve that problem, the inventors of the present invention have proposed in the European patent application EP 05291972 a new transmission scheme of information in the downlink channel or in the uplink channel.

In the patent application EP05921972, the base station BTSa transmits at least a supplementary downlink symbol during the guard period to terminals TE that can receive said at least supplementary downlink symbol thereof and/or the base station BTSa receives during the guard period at least a supplementary uplink symbol from terminals TE that can transmit said at least supplementary uplink symbols during the time delay thereof.

Such technique is described in more details in reference to the FIG. 6.

In the FIG. 6, $n_{ref}$ symbols s1 to s4 are transferred in a nominal part of a sub frame over the downlink channel DL by the base station BTSa at a time referred to as te.

The nominal part of a downlink sub frame is the total duration of the $q_j$ symbols which can be transmitted to terminals TE which are located at the border of the cell or in other words to any terminal located in the cell of the base station BTSa.

The nominal part of an uplink sub frame is the total duration of the $q_j$ symbols which can be transmitted by the terminals TE which are located at the border of the coverage area of the base station BTSa.

After having transmitted the last downlink symbol s4 of the nominal part of a sub frame, the base station BTSa has to wait during the guard period GP, up to time tr, for receiving uplink symbols from terminals TE connected thereto. The duration of the nominal part of a sub frame in the downlink channel is referred to as Dref corresponding to reference number $n_{ref}$ of symbols, for example four.

The base station BTSa is provided for including supplementary downlink symbols in a downlink sub frame, said supplementary downlink symbols being intended to be transmitted only to the terminals TE that can receive and process them during the respective time delay thereof.

If for a terminal situated at a distance d from a base station BTSa, the time delay TD(d) is comprised between the duration of a number $n_{d1}$ of downlink symbols and the duration of a number $n_{d1}+1$ of downlink symbols, respectively plus the switching time RTS, the base station BTSa can insert information for that terminal in $n_{d1}$ supplementary downlink symbols. This condition can be mathematically written as follows:

if $n_{d1} \cdot ts_{d1} \leq TD(d) - RTS < (n_{d1}+1)ts_{d1}$ then insert at most $n_{d1}$ supplementary symbols.

$ts_{d1}$ being the duration of one downlink symbol.

When inserting information for a terminal TEi in $n_{d1}$ supplementary downlink symbols, the base station BTSa indicates this insertion to that terminal TEi (by way of signalling) in order to enable the terminal TEi to read and process this $n_{d1}$ supplementary symbol or these $n_{d1}$ supplementary symbols along with the other symbols comprised in the nominal part of the downlink sub frame.

The base station BTSa informs each terminal TEi connected thereto about the time delay TD or the Timing Advance it has to apply. Then, each terminal TEi, by using the just above expression, deduces from the value of the time delay TD or from the value of the Timing Advance the number of symbols that it has to read and to process.

The number $n_{d1}$ of supplementary downlink symbols that the base station BTSa can allocate to a terminal TEi at a distance d of the base station BTSa is thus determined in the following way:

$n_{d1} = \text{integer}\{(TD(d)-RTS)/ts_{d1}\} = \text{integer}\{(GP-RTD(d)-RTS)/ts_{d1}\}$ The maximum number $N_{d1}max$ of supplementary symbols is given for a terminal TEi that would be located at a zero distance from the base station BTSa and for which the round trip delay RTD is zero $N_{d1}max = \text{integer}\{(GP-RTS)/ts_{d1}\}$ Similar formulas as the above mentioned formulas are used for supplementary uplink channels.

As example, in the case depicted in FIG. 6, as the number $N_{d1}max$ is two, the total number of transmitted downlink symbols is now equal to four downlink symbols s1 to s4 of the nominal part Dref of a sub frame and two supplementary downlink symbols s5 and s6 that are transmitted in the period that is usually considered as a guard period GP. The value of the time delay TD(d1) for a terminal TE1 at the border of the cell 15a, is equal to the switching time RTS in virtue of the definition of the time delay. Only the four downlink symbols s1 to s4 of the nominal part Dref of a sub frame are allocated by the base station BTSa to said terminal TE1. The terminal TE1 only reads and processes those four downlink symbols s1 to s4, the two supplementary symbols s5 and s6, if any, being ignored or not processed.

The value of the time delay TD(d2) for the terminal TE2 is smaller than the duration of two downlink symbols plus the switching time but is however equal to the duration of one downlink symbol plus the switching time RTS. So, the base station BTSa can transmit information to that terminal TE2 within at most one supplementary downlink symbol (here the downlink symbol s5 which follows the last downlink symbol s4 of the nominal part Dref of a downlink sub frame) which is read and processed by said terminal TE2. Symbol s6, if any, is ignored by said terminal TE2 or not processed. In this case, the total number of downlink symbols that can include information for that terminal TE2 is five (the four of the nominal part Dref of a sub frame s1 to s4 plus one supplementary symbol s5).

According to the example of the FIG. 6, the value of the time delay TD(d3) for the terminal TE3 is equal to the duration of two downlink symbols plus the switching time RTS. So, the base station BTSa can transmit information to that terminal TE3 within at most two supplementary downlink symbols s5 and s6 which are read and processed by said terminal TE3. The total number of downlink symbols that include information for that terminal TE3 is six (four of the nominal part Dref of a sub frame s1 to s4 plus two supplementary downlink symbols s5 and s6).

The base station BTSa can transmit information to any terminal TEi located at a distance d of the base station comprised between the distance d2 of the terminal TE2 and the distance d3 of the terminal TE3 within at most five downlink symbols that it can read and process. In the same way, the base station BTSa can transmit information to any terminal located at a distance d shorter than the distance d3 of the terminal TE3 within at most six downlink symbols that it can read and process. Always in the same way, the base station BTSa can transmit information to any terminal located at a distance d larger than the distance d2 of the terminal TE2 within at most four symbols that it can read and process.

Note that the downlink symbol s5 may contain information only for the terminals TE that are located at a distance from the base station BTSa lower than d2 whereas downlink symbol s6 may contain information only for the terminals TE that are located at a distance from the base station BTSa lower than d3.

When a terminal TEi gets connected to the base station BTSa, no information about the time delay TD it has to apply has been received. As long as it is not done, the number of symbols allocated to this terminal TEi is equal to the reference number $n_{ref}$ i.e. the number of symbols allocated to this terminal TEi is equal to the number of symbols comprised in the nominal part Dref of the sub frame. Furthermore, the terminal TEi may transmit in the uplink with a predefined time delay, for instance equal to the guard period GP or to RTS, after receiving a number of symbols equal to the reference number $n_{ref}$.

In some wireless telecommunication networks, each base station BTS of the wireless telecommunication network, determines periodically or on demand or for each downlink and/or uplink sub frame, the transmission power of the symbols transferred through each downlink and/or uplink channel Ch1 to Ch3.

For that, each base station BTS uses the channel quality indication determined by each terminal TEi connected to it and/or takes also into account the distance separating each terminal TEi connected to it from itself and/or takes into account interferences generated in the neighbour coverage areas by the symbols transferred through the downlink and/or uplink channels and takes into account interferences generated, from neighbour coverage areas, by the symbols transferred through the downlink and/or the uplink channels in these neighbour coverage areas.

In half duplex communications, different kinds of interferences may occur. A transmitting base station BTS located in a given coverage area 15 may interfere a receiving terminal located in a adjacent coverage area 15. This is called downlink-to-downlink interference. Reciprocally, a transmitting terminal located in a given coverage area 15 may interfere a receiving base station BTS located in an adjacent coverage area 15. This is called uplink-to-uplink interference. At the network level, downlink-to-downlink interference coordination or uplink-to-uplink interference coordination may be used between adjacent coverage areas 15 to jointly optimize the transmission power of the symbols transferred through each downlink or uplink channel in each coverage area 15 so as to optimise the overall network transmission efficiency.

However, this may result in a too complicated interference coordination process due to a multidimensional optimisation problem that has to be carried out dynamically to follow the time variations of traffic and propagation conditions.

In addition, a transmitting base station BTS located in a given coverage area 15 may interfere a receiving base station BTS located in an adjacent coverage area. In a synchronous network, this downlink-to-uplink interference appears when the propagation time from a first base station BTSa to another base station BTSb is larger than the round trip delay in the coverage area 15a, i.e. when the coverage area 15b is larger than the coverage area 15a. Similarly, an uplink-to-downlink interference may occur when a transmitting terminal located in a given coverage area 15a transmits symbols which are received by another terminal located in another coverage area 15b and receiving symbols from its dedicated base station BTSb.

When supplementary symbols are transferred between the base station and terminals connected thereto, the supplementary symbols generate interference in the coverage areas 15 of neighbour base stations BTS.

Such interferences deteriorate the quality of the communication in the uplink and downlink channels in neighbor coverage areas and decreases the effectiveness, considering the wireless telecommunication network, of the invention as disclosed in the patent application EP05921972.

BRIEF SUMMARY OF THE INVENTION

To that end, the present invention concerns a transmission method in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to at least two terminals, wherein the time delay of each terminal connected thereto is determined, said time delay being such that any terminal after having received all the symbols included in a downlink sub frame followed by an uplink sub frame may transmit other symbols over said uplink sub frame with said time delay so that the other symbols susceptible to be transmitted should be received by said base station at a time separated from the end of the transmission by the base station of the downlink sub frame by a predefined guard period constant whatever said distance, and wherein the transfer of at least one supplementary symbol between the base station and at least one terminal that can receive or transmit said at least one supplementary symbol during the time delay is enabled, the method being characterised in that it comprises the steps of:

obtaining multiplexing resources of the wireless telecommunication system for the transfer of at least a part of the symbols comprised in a sub frame, associating to each obtained multiplexing resource one first transmission power coefficient, multiplexing data on the obtained multiplexing resources in order to form at least a part of each symbol comprised in the sub frame, transferring the at least part of each symbol comprised in the sub frame according to the transmission power coefficients, multiplexing data on the obtained multiplexing resources in order to form at least a part of at least one supplementary symbol, associating for each obtained multiplexing resource one second transmission power coefficient, transferring the at least part of the at least one supplementary symbol according to second transmission power coefficients, each second transmission power coefficient associated to a multiplexing resource being lower than or equal to the first transmission power coefficient associated to the same multiplexing resource as the second transmission power coefficient.

The present invention concerns also a transmission device in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to at least two terminals, wherein the time delay of each terminal connected thereto is determined, said time delay being such that any terminal after having received all the symbols included in a downlink sub frame followed by an uplink sub frame may transmit other symbols over said uplink sub frame with said time delay so that the other symbols susceptible to be transmitted should be received by said base station at a time separated from the end of the transmission by the base station of the downlink sub frame by a predefined guard period constant whatever said distance, and wherein the transfer of at least one supplementary symbol between the base station and at least one terminal that can receive or transmit said at least one supplementary symbol during the time delay is enabled, the transmission being characterised in that it comprises means for obtaining multiplexing resources of the wireless telecommunication for the transfer of at least a part of the symbols comprised in a sub frame, means for associating to each obtained multiplexing resource one first transmission power coefficient, means for multiplexing data on the obtained multiplexing resources in order to form at least a part of each symbol comprised in the sub frame, means for transferring the at least part of each symbol comprised in the sub frame according to the first transmission power coefficients, means for multiplexing data on the obtained multiplexing resources in order to form at least a part of at least one supplementary symbol, means for associating for each obtained multiplexing resource one second transmission power coefficient, means for transferring the at least part of the at least one supplementary symbol according to second transmission power coefficients, each second transmission power coefficient associated to a multiplexing resource being lower than or equal to the first transmission power coefficient associated to the same multiplexing resource as the second transmission power coefficient.

Thus, when supplementary symbols are transferred between the base station and terminals connected thereto, the supplementary symbols doesn't generate, in the coverage areas of neighbour base stations, more interferences than the symbols transferred in sub frames.

The effectiveness, considering the wireless telecommunication network, of the invention as disclosed in the patent application EP05921972 is then improved.

As each base station of the wireless telecommunication network determines for each downlink sub frame, the transmission power of the symbols transferred through each downlink and/or uplink channel, the supplementary symbols doesn't disturb such determination.

Furthermore, the neighbour base stations don't need to determine the transmission power of the symbols transferred through each downlink and/or uplink channel for each supplementary symbol.

According to a particular feature, the multiplexing resources of the wireless telecommunication network are chunks of frequencies and/or codes and/or areas of a coverage area of the base station.

According to a particular feature, each second transmission power coefficient associated to a multiplexing resource is equal to the first transmission power coefficient associated to the same multiplexing resource as the second transmission power coefficient.

Thus, the interferences generated in the neighbour coverage areas by the symbols transferred through the downlink and/or the uplink channels don't change for the at least one supplementary symbol.

The downlink-to-downlink and/or the uplink-to-uplink interference coordination optimisation is not impacted by the transfer of the at least one supplementary symbol and the amount of control information related to the usage of different transmission power coefficients is reduced.

According to a particular feature, each second transmission power coefficient associated to a multiplexing resource is lower than the first transmission power coefficient associated to the same multiplexing resource as the second transmission power coefficient.

Thus, the downlink-to-uplink and/or the uplink-to-downlink interference generated by the transfer of at least one supplementary symbol is reduced.

According to a particular feature, each second transmission power coefficient associated to a multiplexing resource is equal to the lowest first transmission power coefficient.

Thus, the amount of control information related is reduced as far as a single transmission power coefficients needs to be transferred.

According to a particular feature, the method is executed by the base station or the transmission device is a base station.

Thus, the downlink-to-downlink and/or the downlink-to-uplink interferences due to the transmission of at least one supplementary symbol are reduced.

According to a particular feature, the multiplexing resources are obtained by analysing the channel conditions which exist between the base station and each terminal connected to the base station and the base station allocates the multiplexing resources of the wireless telecommunication system to at least two terminals for the de multiplexing of the symbols comprised in the sub frame.

Thus, the multiplexing resources are allocated in an efficient way.

According to a particular feature, a control information is transferred to the terminals indicating the multiplexing resources to be used by the terminals for the de multiplexing of the symbols comprised in the sub frame.

Thus, the de multiplexing of the symbols comprised in the sub frame is facilitated.

According to a particular feature, a second control information is transferred to the terminals indicating if multiplexing resources are allocated to at least one terminal for the de multiplexing of the at least one supplementary symbol.

Thus, the de multiplexing of the symbols comprised in the at least one supplementary symbol is facilitated with a limited amount of signalling.

According to a particular feature, the first control is information multiplexed with data in order to form at least one symbol comprised in the sub frame and the second control information is multiplexed with data in order to form at least one transferred symbol.

Thus, control information can be transferred on multiplexing resources that benefit of good transmission quality.

According to a particular feature, the base station determines, the number of supplementary symbols that can be received or transmitted by each terminal and forms a first group of terminals and at least another group of at least one terminal, the first group of terminals comprising at least terminals which can not receive and/or transmit said at least supplementary symbol during the time delay, the other group of at least one terminal comprising at least a terminal which can receive and/or transmit said at least supplementary symbol during the time delay.

Thus, the allocation of multiplexing resources for the at least one supplementary symbol is simplified.

According to a particular feature, the first group comprises all the terminals and the at least one other group is a second group which comprises the terminals which can receive and/or transmit the maximum number of supplementary symbols.

Thus, the allocation of multiplexing resources for the at least one supplementary symbol is further simplified.

According to a particular feature, the second control information comprises, for each terminal, at least a field which indicates if all the multiplexing resources allocated to the terminals comprised in the first group are allocated to the terminal for all the supplementary symbols.

Thus, the second control information does not consume lots of transmission resources.

According to a particular feature, the first group comprises all the terminals and plural other groups are formed, at least a second group which comprises the terminals which can receive and/or transmit a first number of supplementary symbols and at least a third group which comprises the terminals which can receive and/or transmit a second number of supplementary symbols.

Thus, the supplementary symbols can be shared by several terminals.

According to a particular feature, the first group comprises a part of the terminals which can receive and/or transmit at most a first number of supplementary symbols during the time delay and plural other groups are formed, at least a second group which comprises the terminals which can receive and/or transmit the first number of supplementary symbols and a third group which comprises the terminals which can receive and/or transmit a second number of supplementary symbols.

Thus, the allocation of multiplexing resources can be used more efficiently.

According to a particular feature, the method is executed by a terminal or the transmission device is a terminal.

Thus, the uplink-to-downlink interference and the uplink-to-uplink interference are reduced.

According to a particular feature, the terminal receives a downlink sub frame from the base station and the multiplexing resources are obtained by reading an information which is multiplexed with data in order to form at least one symbol comprised in the received downlink sub frame.

Thus, control information of uplink symbols can benefit from multiplexing resources with good transmission quality.

According to a particular feature, information representative of each first transmission power coefficient are comprised in the received downlink sub frame.

Thus, the reception of information from the multiplexing resources of the sub frame is facilitated.

According to a particular feature, information representative of each second transmission power coefficient are comprised in the received downlink sub frame.

Thus, the reception of information from the multiplexing resources of the at least one supplementary symbol is facilitated.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer program are the same as those set out above related to the methods and devices according to the invention, they will not be repeated here.

DESCRIPTION OF THE SEVERAL VIEWS OF THE DRAWINGS

The characteristics of the invention will emerge more clearly from a reading of the following description of an example embodiment, the said description being produced with reference to the accompanying drawings, among which:

FIG. 10d is an example of the multiplexing resources of the wireless telecommunication system which are allocated in a fourth variant of realisation to the terminals according to the first and second modes of realisation of the present invention;

FIG. 10e is an example of the multiplexing resources of the wireless telecommunication system which are allocated in a fifth variant of realisation to the terminals according to the first and second modes of realisation of the present invention;

FIGS. 11a and 11b are respectively examples of the transmission power of the data multiplexed on the multiplexing resources for the symbols comprised in the nominal part of a sub frame and of supplementary symbols.

DETAILED DESCRIPTION OF THE INVENTION

Figure 1:
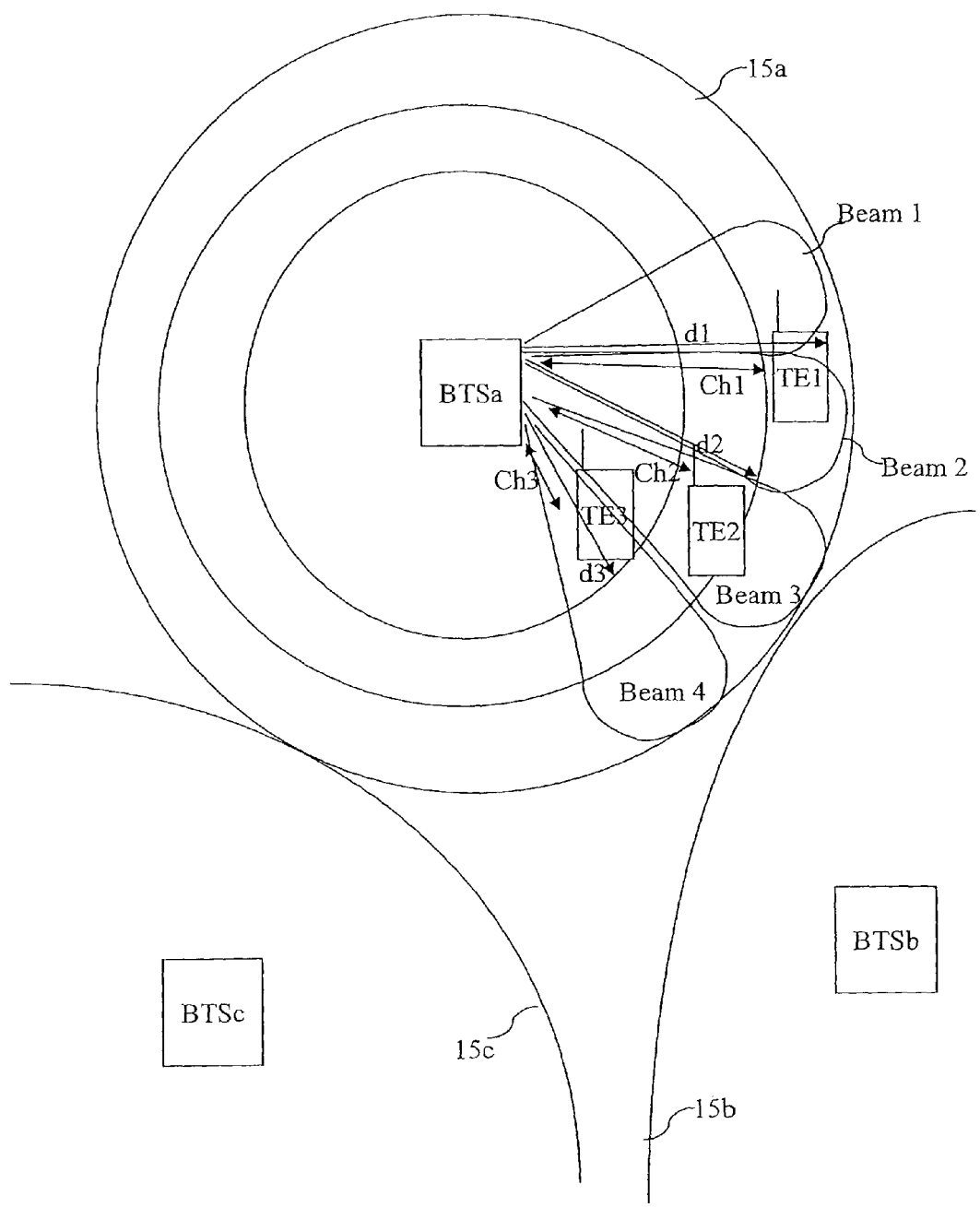
FIG. 1 is a diagram representing the architecture of the wireless telecommunication system in which the present invention is implemented.

FIG. 1 is a diagram representing the architecture of the wireless telecommunication system in which the present invention is implemented.

In the telecommunication system of the FIG. 1, at least one and preferably plural terminals TE1, TE2 and TE3 are comprised in a coverage area 15a of a base station BTSa. The base station BTSa intends to communicate with at least one terminal TEi, here three terminals TE1, TE2 and TE3, over wireless communication channels Ch1 to Ch3 respectively.

The present invention will be described in a wireless network like a wireless cellular network or a local area network but the present invention is also applicable to wired networks like power line networks.

The coverage area 15a of the base station BTSa is neighbour from the coverage area 15b of the base station BTSb and from the coverage area 15c of the base station BTSc Only three coverage areas 15a to 15c of the base stations BTSa to BTSc are shown in the FIG. 1 for the sake of simplicity but in practice, and especially when the wireless network is a wireless cellular network, the wireless cellular telecommunication system is composed of a more important number of base stations and cells.

Only three terminals TE are shown in the FIG. 1 for the sake of simplicity but in practice, a more important number of terminals are in the coverage area 15a of the base station BTSa.

The base stations BTS are also named nodes or nodes B or enhanced nodes B or access points.

The terminals TE1 to TE3 are terminals like mobile phones, personal digital assistants, or personal computers.

Figure 6:
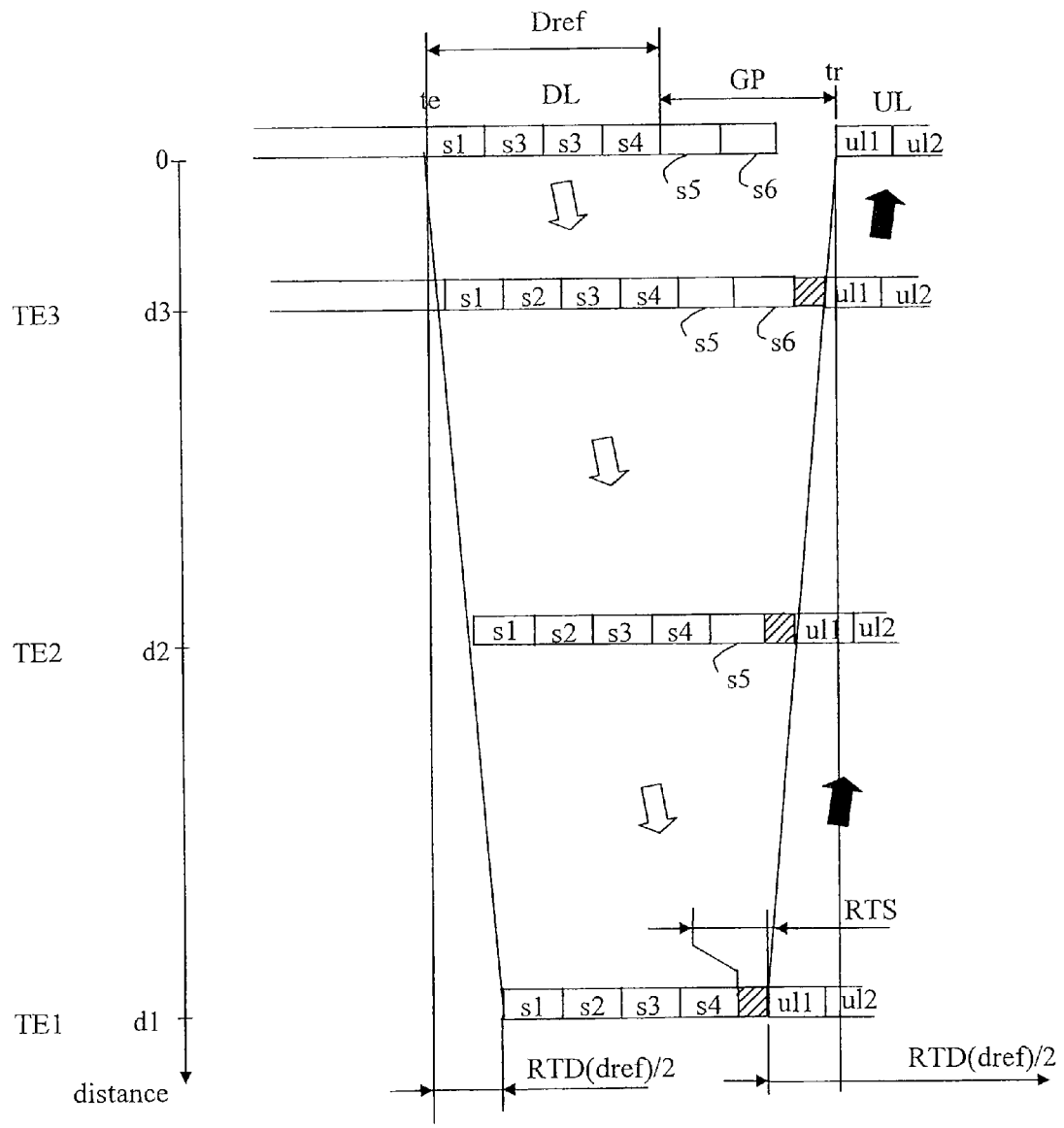
FIG. 6 is a chronogram depicting the transmission of information in the downlink of a telecommunication system according to the state of the art.

As it has been disclosed in the FIG. 6, the base station BTSa is provided for including supplementary downlink symbols, said supplementary downlink symbols being intended to be transmitted only to the terminals TE that can receive and process them during the respective time delay thereof. The base station BTSa is also provided for including supplementary uplink symbols, said supplementary uplink symbols being intended to be transmitted only by the terminals TE that can transmit and process them during the respective time delay thereof.

The base station BTSa can insert information for a terminal TEi in $n_{d1}$ supplementary symbols. This condition can be mathematically written as follows:

if $n_{d1} \cdot ts_{d1} \leq TD(d) - RTS < (n_{d1}+1)ts_{d1}$ then insert at most $n_{d1}$ supplementary symbols.

$ts_{d1}$ being the duration of one downlink symbol.

According to the examples of the FIGS. 1 and 6, the number $N_{d1}$max is two, but a more important number of supplementary symbols can be determined, as example, according to the coverage area of the base station BTSa and/or according to the duration of OFDM symbols.

Similar formulas as the above mentioned formulas are used for supplementary uplink channels.

As example, the wireless telecommunication system is a wireless telecommunication system which uses Time Division Duplexing scheme (TDD) or Frequency Division Duplexing scheme (FDD), more precisely a half duplex FDD scheme.

In TDD scheme, the signals transferred in uplink and downlink channels are duplexed in different sub frames, named also time slots, in the same frequency band.

In half duplex FDD scheme, the signals transferred in uplink and downlink channels are duplexed in different sub frames, named also time slots, in different frequency bands.

When the base station BTSa transfers symbols to a terminal TEi, with i=1 to 3, the data, the signals or the messages are transferred through downlink sub frames of the downlink channel.

When a terminal TEi, with i=1 to 3, transfers symbols to the base station BTSa, the signals or data are transferred through uplink sub frames of the uplink channel.

In a first mode of realisation of the present invention, Frequency Division Multiple Access technique is used in the wireless telecommunication system in order to multiplex information of plural terminals TE.

In a second mode of realisation of the present invention, Code Division Multiple Access technique is used in the wireless telecommunication system in order to multiplex information of plural terminals TE.

In a third mode of realisation of the present invention, Space Division Multiple Access technique is used in the wireless telecommunication system in order to multiplex information of plural terminals TE. The Beams noted Beam1, Beam2, Beam3 and Beam4 in the FIG. 1 represent a part of the space division of the coverage area 15a of the base station BTSa.

It has to be noted that the techniques used in the first and/or second and/or third modes of realisation can be also combined.

Preferably, when a terminal TEi transfers a symbol, the terminal TEi multiplexes data on allocated multiplexing resources, and sets null value on multiplexing resources which are not allocated to it.

The base station BTS receives symbols. Each received symbol is formed by the symbols transferred by at least a part of the terminals TE.

Figure 2:
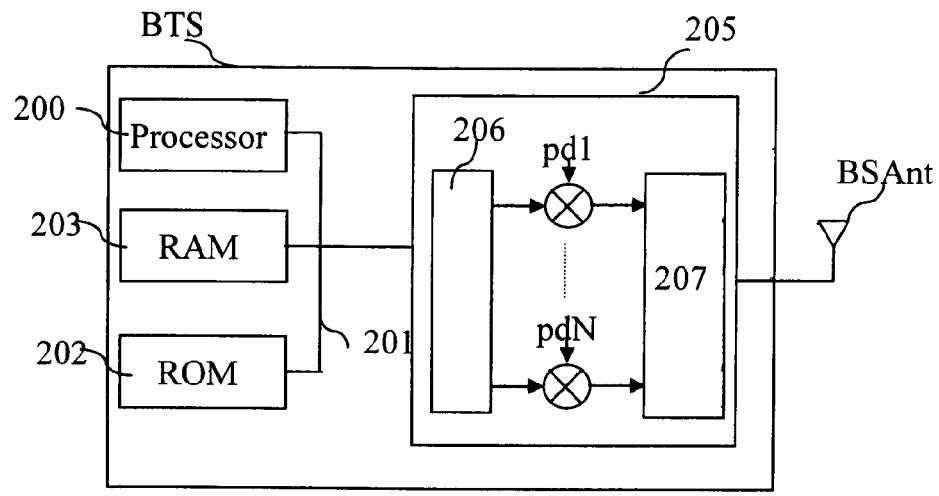
FIG. 2 is a diagram representing the architecture of a base station of the wireless telecommunication system according to the present invention.

FIG. 2 is a diagram representing the architecture of a base station according to the present invention.

Figure 7:
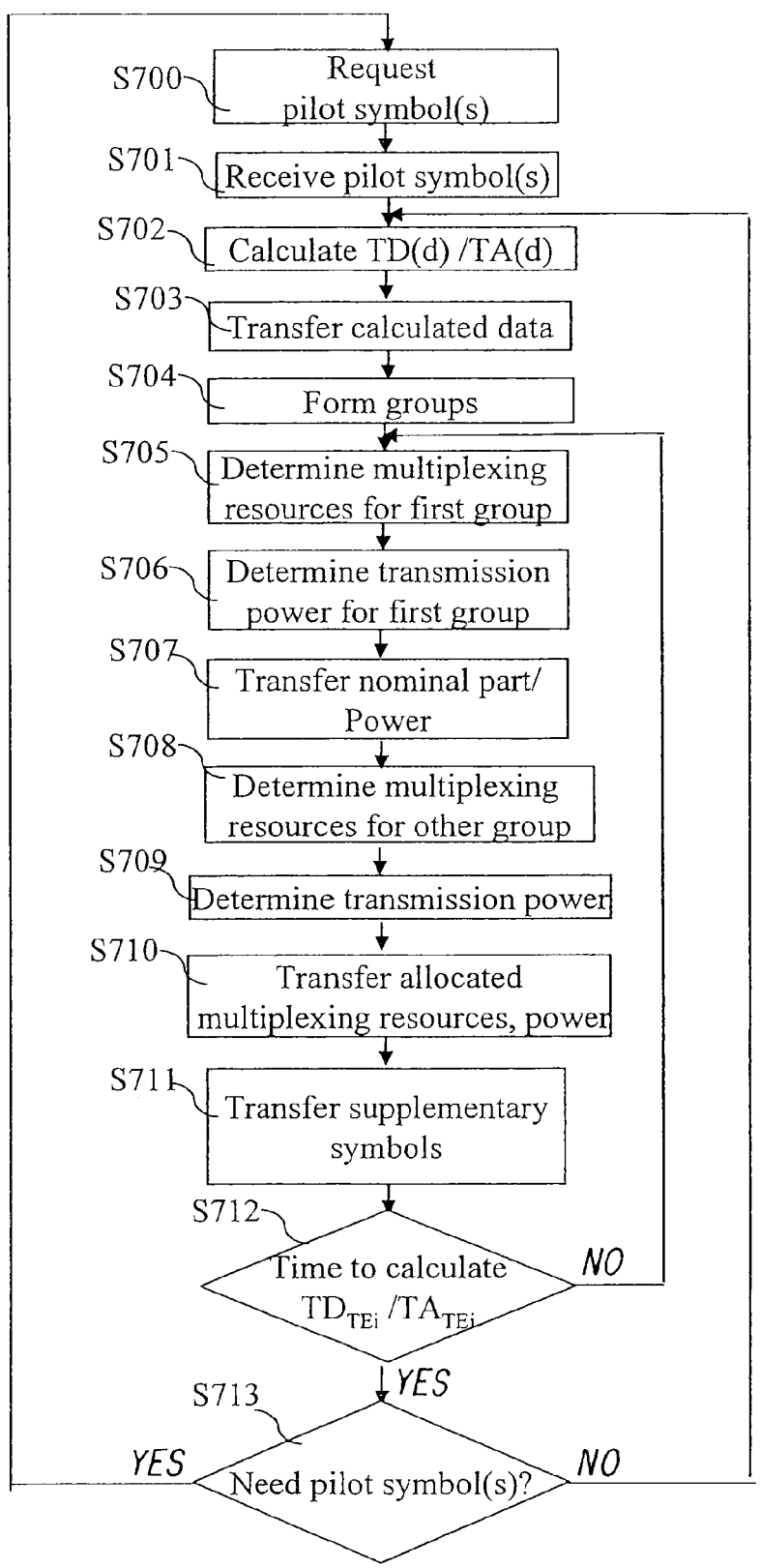
FIG. 7 is an algorithm executed by a base station according to the present invention.

The base station BTSa has, for example, an architecture based on components connected together by a bus 201 and a processor 200 controlled by the program related to the algorithm as disclosed in the FIG. 7.

It has to be noted here that the base station BTSa is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203 and a channel interface 205.

The read only memory ROM 202 contains instructions of the programs related to the algorithm as disclosed in the FIG. 7 which are transferred, when the base station BTSa is powered on to the random access memory RAM 203.

The RAM memory 203 contains registers intended to receive variables, and the instructions of the programs related to the algorithm as disclosed in the FIG. 7.

The processor 200 determines periodically or on demand or for each downlink sub frame, and for each multiplexing resource, a first transmission coefficient for the symbols transferred through each downlink sub frame.

Figures 9, 10A, 10B, 10C:
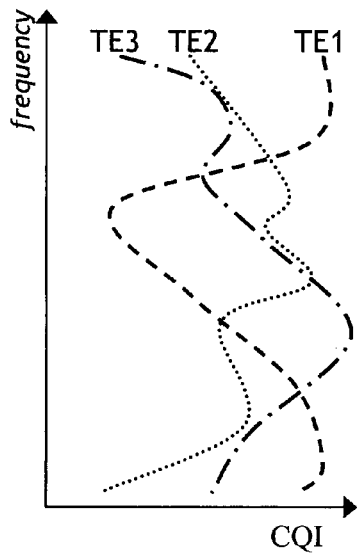
FIG. 9 is an example of the channel quality indication determined between the base station and each terminal according to the first and second modes of realisation of the present invention.
FIG. 10a is an example of the multiplexing resources of the wireless telecommunication system which are allocated in a first variant of realisation of the present invention to the terminals according to the first and second modes of realisation of the present invention.
FIG. 10b is an example of the multiplexing resources of the wireless telecommunication system which are allocated in a second variant of realisation of the present invention to the terminals according to the first and second modes of realisation of the present invention.
FIG. 10c is an example of the multiplexing resources of the wireless telecommunication system which are allocated in a third variant of realisation to the terminals according to the first and second modes of realisation of the present invention.
Figures 12, 13, 14A, 14B, 14C:
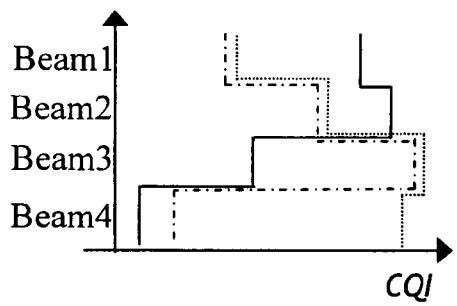
FIG. 12 is an example of the channel quality indication determined between the base station and each terminal according to the third mode of realisation of the present invention.
FIG. 13 is an example of the multiplexing resources of the wireless telecommunication system which are allocated according to the present invention to the terminals according to the third mode of realisation of the present invention.
FIGS. 14a and 14c show control information which convey information indicating the allocated multiplexing resources according to the present invention which are transferred by the base station to terminals.
FIG. 14b is a correspondence table which shows the correspondence between each short identifier of a terminal and the identifier of the terminal.

For that, the processor 200 uses the channel quality indication determined by each terminal TEi as the one disclosed in the FIG. 9 or 12 and/or takes also into account the distance separating each terminal TEi from the base station BTSa and/or takes into account interferences generated in the neighbour coverage areas 15b and 15c by the symbols transferred through the downlink sub frame and/or takes also into account interferences generated from neighbour coverage areas 15b and 15c by the symbols transferred through the downlink and uplink channels in these neighbour coverage areas.

The processor 200 determines periodically or on demand or for each uplink sub frame, the transmission power of the symbols transferred by the terminals TE through the uplink channels Ch1 to Ch3.

For that, the processor 200 uses the channel quality indication determined by the base station BTSa and/or takes also into account the distance separating each terminal TEi from the base station BTSa and/or takes into account interferences generated in the neighbour coverage areas 15b and 15c by the symbols transferred through the uplink sub frame and/or takes also into account interferences generated from neighbour coverage areas 15b and 15c by the symbols transferred through the downlink and uplink channels in these neighbour coverage areas.

According to the first mode of realisation of the present invention, the transmission power coefficients are determined for each chunk of frequencies or for at least a part of the frequencies comprised in each chunk of frequencies.

According to the second mode of realisation of the present invention, the transmission power coefficients are adjusted for each code.

The processor 200 is able to determine the multiplexing resources allocated to the terminals TE.

The multiplexing resources allocated to at least a part of the terminals TE which belong to the first group are the multiplexing resources used by the corresponding terminal TEi for de multiplexing the downlink symbols of the nominal part of a downlink sub frame and/or are the multiplexing resources used by the corresponding terminal TEi for multiplexing the data on multiplexing resources in order to form uplink symbols of the nominal part of an uplink sub frame.

The multiplexing resources allocated to the at least one terminal TEi which belongs to the other group are the multiplexing resources used by the base station BTSa for multiplexing data in order to form the supplementary downlink symbols and/or are the multiplexing resources used by the base station BTSa for de multiplexing the supplementary uplink symbols.

The channel interface 205 comprises means for multiplexing 206 data on multiplexing resources in order to form each downlink symbol of the downlink sub frame to be transferred to at least a part of the terminals TE which belong to the first group.

The channel interface 205 comprises means for requesting the transmission of at least one pilot symbol by each terminal TEi and means for receiving at least one pilot symbol from each terminal TEi.

The channel interface 205 comprises means for multiplexing 206 data on multiplexing resources in order to form the symbols transferred in the nominal part of a downlink sub frame to be transferred to at least a part of the terminals TE belonging to the first group.

The channel interface 205 comprises means for weighting pd1 to pdN the multiplexed data on each multiplexing resource by a first transmission power coefficient determined for that multiplexing resource.

The channel interface 205 comprises means for multiplexing 206 data in order to form at least one downlink supplementary symbol to be transferred to at least one terminal TEi on multiplexing resources allocated to the at least one terminal TEi belonging to the other group. The at least one supplementary symbol is multiplexed on multiplexing resources allocated to the terminals TE belonging to the first group or is multiplexed on multiplexing resources allocated to the terminal TEi for the symbols comprised in the nominal part of the downlink sub frame.

The channel interface 205 comprises means for weighting pd1 to pdN the multiplexed data on each multiplexing resource by a second transmission power coefficient determined for that multiplexing resource.

The channel interface 205 comprises means for de multiplexing the symbols comprised in the nominal part of an uplink sub frame transferred by at least one terminal TEi which belongs to the first group from the multiplexing resources allocated to the terminals TE belonging to the first group.

The channel interface 205 comprises means for de multiplexing at least a part of one uplink supplementary symbol transferred by at least one terminal TEi which belongs to the other group from the multiplexing resources allocated to that terminal TEi.

The channel interface 205 comprises means for combining the weighted data 207.

According to the first mode of realisation of the present invention, the means for combining the weighted data 207 are an Inverse Discrete Fourier Transform module.

According to the second mode of realisation of the present invention, the means for combining the weighted data 207 are a summation circuit.

According to the third mode of realisation of the present invention, the means for combining the weighted data 207 are beamformers and the antenna BSAnt is an array of antennas.

A supplementary symbol can either be a downlink symbol and/or an uplink symbol.

According to the third mode of realisation of the present invention, the channel interface 205 comprises means for directing the signals transferred by the base station BTSa into different areas as the areas noted Beam 1 to Beam 4 in the FIG. 1. More precisely, when the base station BTSa transmits signals into a given area through the downlink channel, the signals are M times duplicated, where M>1, the duplicated signals are weighted in order to perform beamforming using M antennas, i.e. controls the spatial direction of the transmitted signals in order to form N beams.

The weights used for weighting the signals in order to perform beamforming comprise also the transmission power coefficients according to the present invention.

Through the channel interface 205, the processor 200 transfers control information as the one which will be disclosed hereinafter in reference to the FIG. 14a to 14c.

Figure 3:
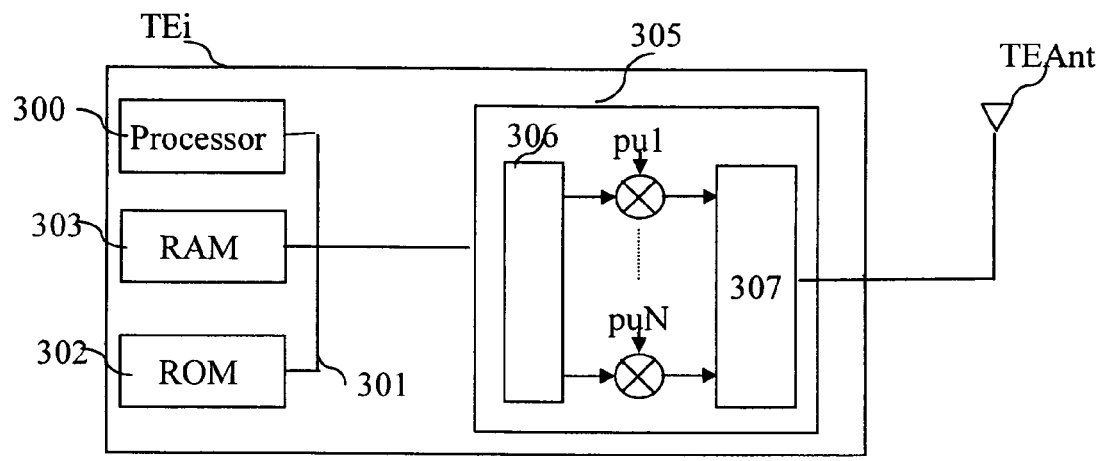
FIG. 3 is a diagram representing the architecture of a terminal of the wireless telecommunication system according to the present invention.
Figure 4:
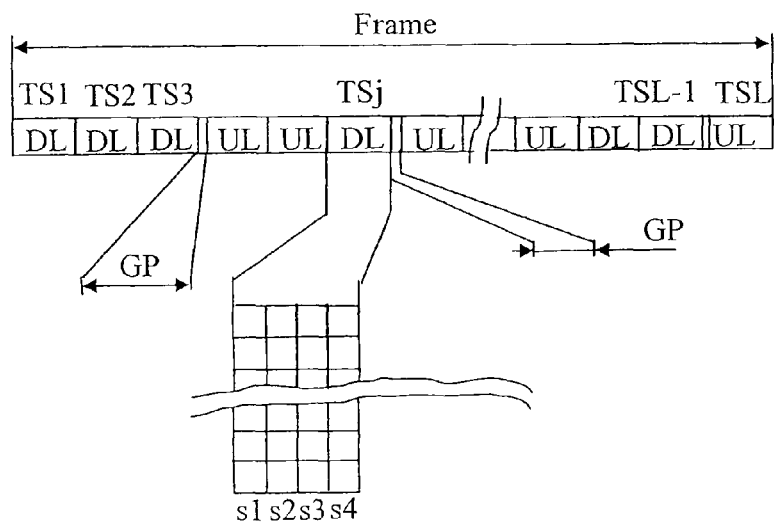
FIG. 4 is a chronogram depicting the structure of a conventional HD/OFDM frame.
Figure 5:
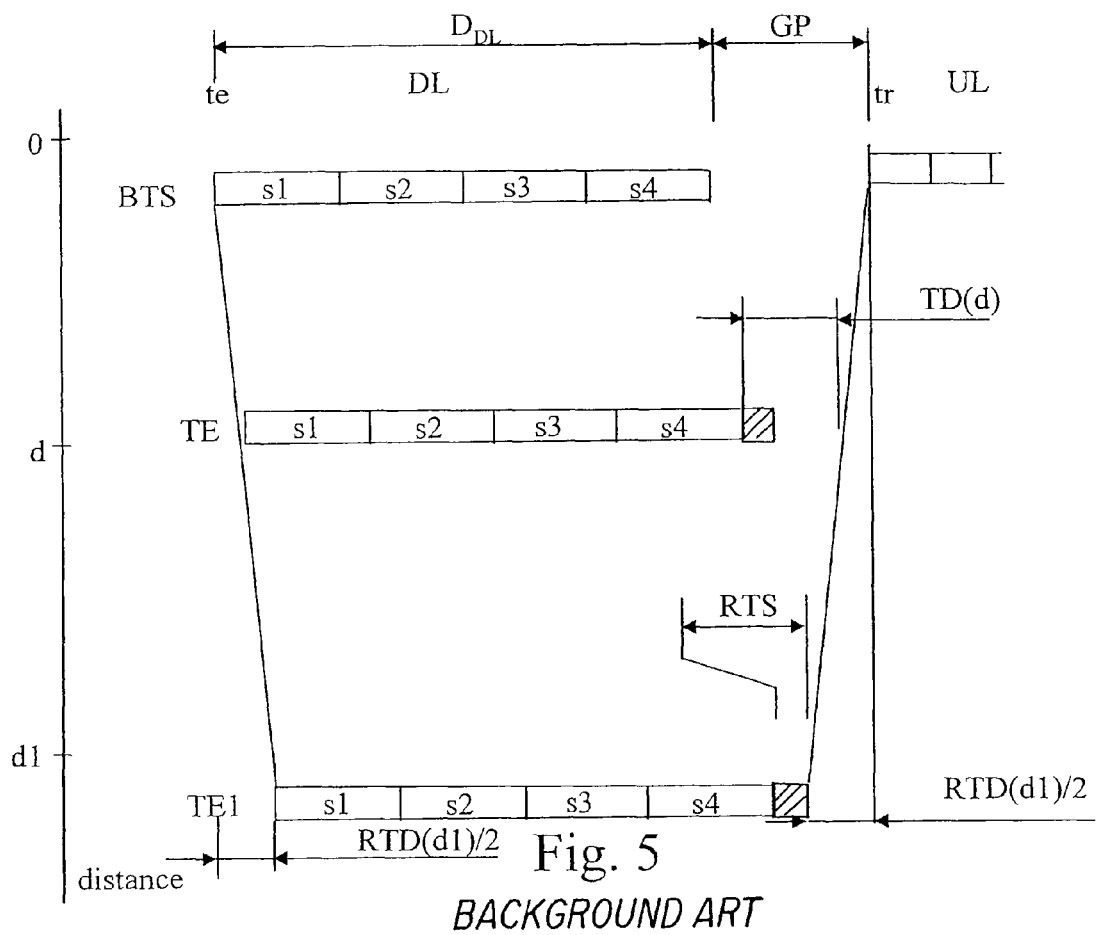
FIG. 5 is a chronogram depicting the transmission of information in the downlink of a telecommunication system according to the state of the art.

FIG. 3 is a diagram representing the architecture of a terminal of the wireless telecommunication network according to the present invention.

Figure 8:
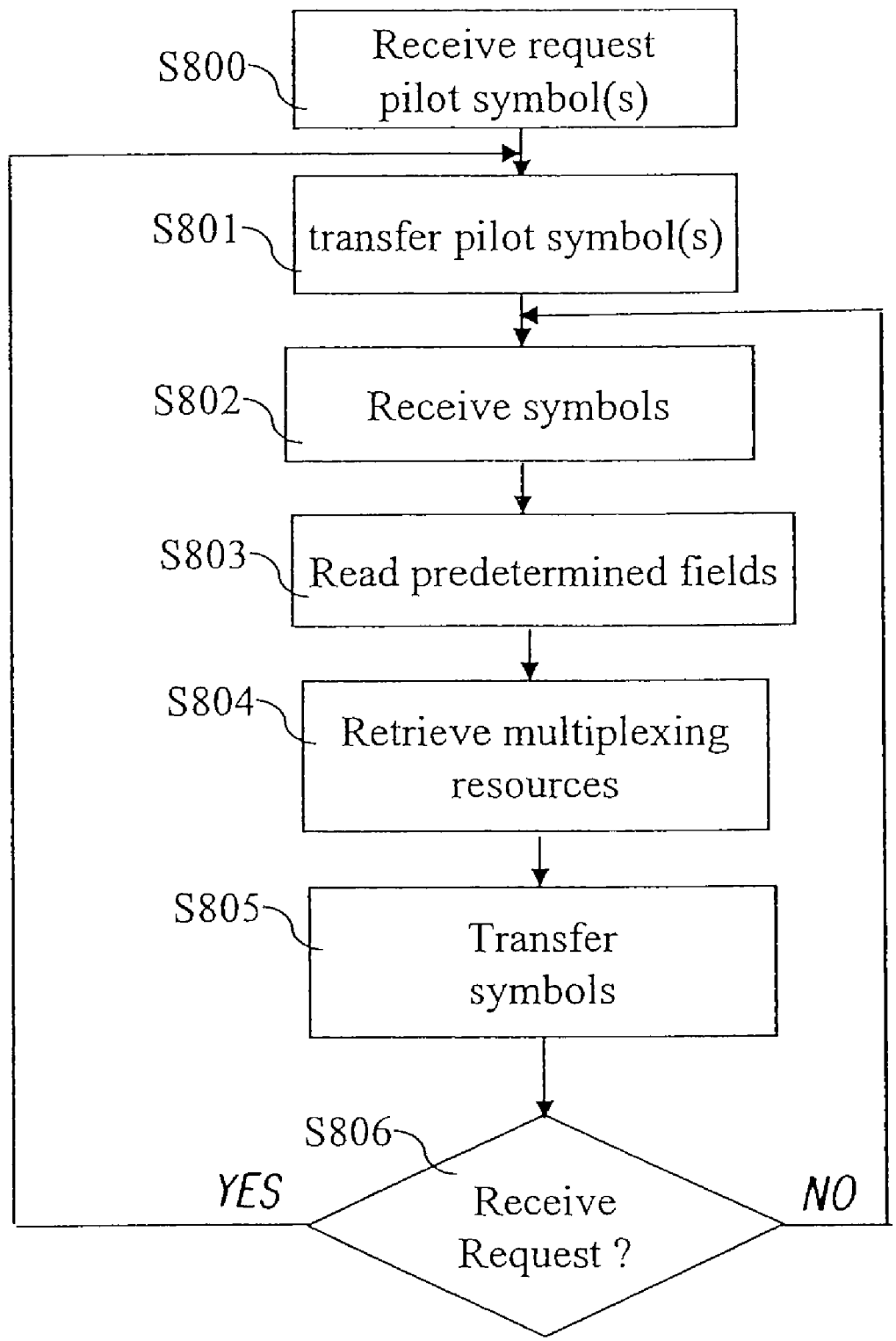
FIG. 8 is an algorithm executed by a terminal according to the present invention when the terminal transfers at least one supplementary uplink symbol through the uplink channel according to the fourth variant of realisation of the present invention.

Each terminal TEi, as example the terminal TE1, has, for example, an architecture based on components connected together by a bus 301 and a processor 300 controlled by programs related to the algorithm as disclosed in the FIG. 8.

It has to be noted here that the terminal TE1 is, in a variant, implemented under the form of one or several dedicated integrated circuits which execute the same operations as the one executed by the processor 300 as disclosed hereinafter.

The bus 301 links the processor 300 to a read only memory ROM 302, a random access memory RAM 303 and a channel interface 305.

The read only memory ROM 302 contains instructions of the program related to the algorithm as disclosed in the FIG. 8 which are transferred, when the terminal TE1 is powered on to the random access memory RAM 303.

The RAM memory 303 contains registers intended to receive variables, and the instructions of the program related to the algorithm as disclosed in the FIG. 8.

The channel interface 305 comprises means for receiving at least one pilot symbol request from the base station BTSa and means for transferring at least one pilot symbol to the base station BTSa.

Through the channel interface 305, the processor 300 receives control information as the one which will be disclosed hereinafter in reference to the FIG. 14.

Through the channel interface 305, the processor receives information representative of the transmission power coefficient associated to each multiplexing resource allocated to it.

The channel interface 305 comprises means for de-multiplexing each downlink symbol of the nominal part Dref of the downlink sub frame received by the terminal TE1 if the terminal TE1 belongs to the first group on corresponding multiplexing resources allocated by the base station BTSa if there are some.

The channel interface 305 comprises means for de-multiplexing at least one supplementary downlink symbol received by the terminal TE1 if the terminal TE1 belongs to the second group.

The channel interface 305 comprises means for weighting pu1 to puN the multiplexed data on each multiplexing resource by a first transmission power coefficient determined for that multiplexing resource.

The channel interface 305 comprises means for multiplexing 306 data in order to form at least one uplink supplementary symbol to be transferred to the base station BTSa on multiplexing resources allocated to the terminal TE1 if it belongs to the other group. The at least one supplementary symbol is multiplexed on multiplexing resources allocated to the terminal TE1 for the symbols comprised in the nominal part of the uplink sub frame.

The channel interface 305 comprises means for weighting pu1 to puN the multiplexed data on each multiplexing resource by a second transmission power coefficient determined for that multiplexing resource.

The channel interface 305 comprises means for de multiplexing the symbols comprised in the nominal part of a downlink sub frame transferred by the base station BTSa from the multiplexing resources allocated to the terminal TE1.

The channel interface 305 comprises means for de multiplexing the at least one supplementary symbol transferred by the base station BTSa from the multiplexing resources allocated to the terminal TEi FIG. 7 is an algorithm executed by a base station according to the present invention.

The present algorithm is executed by at least one base station BTSa of the wireless telecommunication system. More precisely, the present algorithm is executed by the processor 200 of the base station BTSa.

At step S700, the processor 200 commands the transfer, through the channel interface 205, of at least one pilot symbol by each terminal TEi, with i=1 to 3.

At next step S701, the processor 200 detects, through the channel interface 205, the reception of at least one pilot symbol transferred by each terminal TEi.

At next step S702, the processor 200 calculates a timing delay TD(d) for each terminal TEi, where d is the distance between the base station BTSa and the terminal TEi.

Each timing delay TD(d) is calculated using the following formula:

$TD(d)=tr-te-D_{DL}-RTD(d)=GP-RTD(d), D_{DL}$ being the total duration of the nominal part of the downlink sub frame to be transferred.

At the same step, the processor 200 calculates, for each terminal TEi, the Timing Advance using the following formula:

$TA(d)=GP-TD(d)$.

At next step S703, the processor 200 commands the transfer of at least one of the data calculated at step S702 to each corresponding terminal TEi.

The data calculated at step S702 will be transferred by the channel interface 205 in next downlink sub frame. The calculated data will be multiplexed with other data and transferred under the form of symbols of the nominal part of a downlink sub frame.

At next step S704, the processor 200 forms at least two groups of terminals TE.

For that, the processor 200 determines, for each terminal TEi, the number $n_{d1\,TEi}$ of supplementary downlink symbols that the base station BTSa can allocate to the terminal TEi using the following formula:

$n_{d1\,TEi}$=integer$\{(TD(d)-RTS)/ts_{d1}\}$=integer$\{(GP-RTD(d)-RTS)/ts_{d1}\}$ where $ts_{d1}$ is the duration of one downlink symbol.

It has to be noted here that $n_{d1\,TEi}$ is also representative of the number of supplementary uplink symbols that the base station BTSa can allocate to the terminal TEi.

The processor 200 forms a first group which comprises at least the terminals TE of which $n_{d1\,TEi}$ is strictly lower than one and at least one other group which comprises the terminals TE of which $n_{d1\,TEi}$ is larger than or equal to one.

According to the first variant of the present invention, the first group comprises the terminals TE of which $n_{d1\,TEi}$ is equal to or upper than null value, i.e. all the terminals TE, and the at least one other group is a second group which comprises the terminals TE of which $n_{d1\,TEi}$ is maximum.

According to the second variant of the present invention, the first group comprises the terminals TE of which $n_{d1\,TEi}$ is equal to or upper than null value, and plural other groups are formed, at least a second group which comprises the terminals TE of which $n_{d1\,TEi}$ is equal to a first value and a third group which comprises the terminals TE of which $n_{d1\,TEi}$ is equal to a second value different from the first value.

As example, the second group comprises the terminals TE of which $n_{d1\,TEi}$ is equal to one and the third group which comprises the terminals TE of which $n_{d1\,TEi}$ is equal to two.

In another example, the second group comprises the terminals TE of which $n_{d1\,TEi}$ is equal to three and the third group which comprises the terminals TE of which $n_{d1\,TEi}$ is equal to six.

According to the third variant of the present invention, the first group comprises the terminals TE of which $n_{d1\,TEi}$ is lower than or equal to a first value and plural other groups are formed, at least a second group which comprises the terminals TE of which $n_{d1\,TEi}$ is equal to a first value and a third group which comprises the terminals TE of which $n_{d1\,TEi}$ is equal to a second value different from the first value.

As example, the first value is equal to one and the second value is equal to two.

In another example, the first value is equal to two and the second value is equal to four.

According to a fourth variant of the present invention, the first group comprises all the terminals TE and plural other groups are formed, at least a second group which comprises the terminals TE of which $n_{d1\,TEi}$ is equal to or higher than a first value and a third group which comprises the terminals TE of which $n_{d1\,TEi}$ is equal to a second value.

According to a fifth variant of the present invention, the first group comprises the terminals TE of which $n_{d1\,TEi}$ is lower than or equal to a first value and plural other groups are formed, at least a second group which comprises the terminals TE of which $n_{d1\,TEi}$ is equal to or higher than the first value and a third group which comprises the terminals TE of which $n_{d1\,TEi}$ is equal to a second value.

It has to be noted here that, on other variants, the processor 200 forms more than two other groups which comprise respectively terminals TE of which $n_{d1\,TEi}$ is comprised within different values.

At next step S705, the processor 200 allocates the multiplexing resources of the wireless telecommunication system to at least a part of the terminals TE which belong to the first group.

It has to be noted here that, when several hundreds of terminals TE belong to the first group, the processor 200 can allocate, for a sub frame, the multiplexing resources to only a part of the terminals TE which belong to the first group. The processor 200 may then modify, for each sub frame, the terminals TE of the first group to which multiplexing resources are allocated.

According to the first and second modes of realisation of the present invention, the processor 200 preferably allocates the multiplexing resources of the wireless telecommunication system to the terminals TE which belong to the first group according to the channel quality indications as shown in the FIG. 9.

The multiplexing resources are, according to the first mode of realisation of the present invention, chunks of frequencies. A chunk of frequencies comprises at least one carrier frequency or comprises a group of carrier frequencies which are preferably consecutive.

The multiplexing resources are, according to the second mode of realisation of the present invention, codes. A code is a sequence of bits. Preferably the allocated codes are orthogonal from each other.

Examples of allocated multiplexing resources will be described in reference to the FIGS. 10a to 10e.

The multiplexing resources are, according to the third mode of realisation of the present invention, areas of the coverage area 15a of the base station BTSa.

An example of allocated multiplexing resources will be described in reference to the FIG. 13.

According to the third mode of realisation of the present invention, the processor 200 preferably allocates the multiplexing resources of the wireless telecommunication system to the terminals TE which belong to the first group according to the channel quality indications as shown in the FIG. 12.

The multiplexing resources allocated to each terminal TEi which belongs to the first group are the multiplexing resources used by the base station BTSa for multiplexing the downlink symbols, like s1 to s4 of the FIG. 6, of the nominal part of the downlink sub frame.

The multiplexing resources allocated to each terminal TEi which belongs to the first group are the multiplexing resources used by the corresponding terminal TEi for de multiplexing the downlink symbols, like s1 to s4 of the FIG. 6, of the nominal part Dref of a sub frame.

At step S706, the processor 200 determines, for each allocated multiplexing resource to the terminals TE belonging to the first group, one transmission power coefficient for the symbols comprised in the nominal part of the downlink sub frame.

For that, the processor 200 uses the channel quality indication determined by each terminal TEi as the one disclosed in the FIG. 9 or 12 and/or takes also into account the distance separating each terminal TEi from the base station BTSa and/or takes into account interferences generated in the neighbour coverage areas 15b and 15c by the symbols transferred through the sub frame and/or takes into account interference generated from the neighbour coverage areas 15b and 15c.

The processor 200 determines, for each allocated multiplexing resource to the terminals TE belonging to the first group, one transmission power coefficient of the symbols comprised in the nominal part of the uplink sub frame.

For that, the processor 200 uses the channel quality indication determined by the base station BTSa and/or takes also into account the distance separating each terminal TEi from the base station BTSa and/or takes into account interferences generated in the neighbour coverage areas 15b and 15c by the symbols transferred through the uplink sub frame and/or takes into account interference generated from the neighbour coverage areas 15b and 15c.

It has to be noted here that the step S706 is, in a variant, not executed for each sub frame but for a predetermined number of sub frames.

At next step S707, the processor 200 commands the transfer of the downlink symbols transferred in the nominal part of the downlink sub frame.

The downlink symbols transferred in the nominal part of the downlink sub frame are transferred according to the first transmission power coefficients determined at step S706.

Information representing the determined transmission power coefficients are comprised with data in order to form the downlink symbols comprised in the nominal part of the downlink sub frame.

At next step S708, the processor 200 allocates the multiplexing resources of the wireless telecommunication system to at least one terminal TEi which belongs to the other group.

The multiplexing resources allocated to the at least one terminal TEi which belongs to the other group are the multiplexing resources used by the base station BTSa for multiplexing the supplementary downlink symbols, like s5 and/or s6 of the FIG. 6, and/or for de multiplexing the supplementary uplink symbols.

The multiplexing resources are chunks of frequencies or codes or areas of the coverage area 15a of the base station BTSa.

At step S709, the processor 200 determines, for each multiplexing resource allocated to the at least one terminal TEi which belongs to the other group a second transmission power coefficient.

According to the invention, each second transmission power coefficient associated to a multiplexing resource is lower than or equal to the first transmission power coefficient associated to the same multiplexing resource as the second transmission power coefficient.

At next step S710, the processor 200 commands the transfer of control information indicating the allocated multiplexing resources to the terminals TE, of the first transmission power coefficients and if needed of the second transmission power coefficients through the channel interface 205.

When the transmission power coefficients are different from each other, an information related to these transmission power coefficients needs to be transferred in order to facilitate the reception of the symbols on the corresponding multiplexing resources.

Examples of the control information which convey information indicating the allocated multiplexing resources will be given in reference to the FIG. 14.

At next step S711, the processor 200 commands the transfer of the at least one supplementary symbol if it is a downlink supplementary symbol through the channel interface 205.

At next step S712, the processor 200 checks if it is time to calculate again for each terminal TEi the corresponding timing delay TD(d) and/or the Timing Advance TA(d). As example and in a non limitative way, the timing delay TD(d) and/or the Timing Advance TA(d) are calculated on demand or periodically like every second.

If it is time to calculate again the timing delays and/or the Timing Advances, the processor 200 moves to step S713 and executes again the present algorithm.

If it is not time to calculate again the timing delays and/or the Timing Advances, the processor 200 returns to step S705 and executes the steps S705 to S712 as far as it is time to calculate again the timing delays and/or the Timing Advances.

It has to be noted here that, the terminals TE to which multiplexing resources have been allocated for a sub frame may change each time the loop constituted by the steps S705 to S712 is executed. Also, the at least one terminal TEi to which multiplexing resources are allocated at step S706 can be replaced anytime by another terminal TEi belonging to the other group.

At step S713, the processor 200 checks whether or not pilot symbols need to be transferred by the terminals TE.

When the terminals TE transfer symbols in the uplink sub frames, the processor 200 can determine the Time Delay of the Timing Advance from these symbols. When the terminals TE don't transfer symbols in the uplink sub frames, the processor 200 needs to receive pilot symbols in order to determine the Time Delay or the Timing Advance.

If pilot symbols need to be transferred by the terminals TE, the processor 200 returns to step S700, otherwise the processor 200 returns to step S702.

FIG. 8 is an algorithm executed by a terminal according to the present invention when the terminal transfers at least one supplementary uplink symbol through the uplink channel according to the fourth variant of realisation of the present invention.

The present algorithm is executed by each terminal TEi, where i=1 to 3, of the wireless telecommunication system. More precisely, the present algorithm is executed by the processor 300 of each terminal TEi.

At step S800, the processor 300 detects, through the channel interface 305, the reception of a request for transmission of at least one pilot symbol transferred by the base station BTSa.

At next step S801, the processor 300 commands the transfer, through the channel interface 305, of at least one pilot symbol to the base station BTSa.

At next step S802, the processor 300 detects the reception, through the channel interface 305, of downlink symbols.

At next step S803, the processor 300 reads at least one predetermined field of the control information comprised in the received symbols. Examples of predetermined fields will be given in reference to the FIG. 14.

The information comprised in the at least one predetermined field are information indicating the allocated multiplexing resources to the terminal TEi.

The processor 300 reads also information representing the first transmission power coefficients for the symbols comprised in the nominal part of the uplink sub frame which are preferably multiplexed with data in order to form the downlink symbols.

Preferably the first transmission power coefficients for the symbols comprised in the nominal part of the uplink sub frame are also used for the transfer of at least one part of at least one supplementary uplink symbol. In such case, the processor 300 sets second transmission power coefficient associated to a multiplexing resource to the value of the first transmission power coefficient associated to the same multiplexing resource as the second transmission power coefficient.

In a variant, the processor 300 reads also information representing the second transmission power coefficients for at least a part of at least one supplementary uplink symbol which are preferably multiplexed with data in order to form the downlink symbols.

It has to be noted here that the received symbols may also comprise the timing delay TD(d) and/or the Timing Advance for the terminal TEi.

At next step S804, the processor 300 retrieves the information indicating the allocated multiplexing resources which are comprised in at least a field of the received control information.

More precisely, the processor 300 reads at least one field of a first control information comprising information indicating the multiplexing resources which may be allocated to the terminal.

According to the first, second, third and fifth variants of realisation, the processor 300 reads at least one field of a second control information comprising information indicating if multiplexing resources are allocated to the terminal TEi for at least one supplementary symbol to be received or transferred by the terminal TEi within the time delay.

According to the fourth variant of realisation, the processor 300 calculates, from the Timing Delay TD(d) and/or from the Timing Advance, the number of supplementary uplink symbols the terminal TEi can transfer during the Guard period.

The multiplexing resources which are allocated to the terminal TEi for the multiplexing of the at least one supplementary uplink symbols are the same as the one allocated for multiplexing uplink symbols comprised in the nominal part of the uplink sub frame.

At the same step, the processor 300 commands the transfer of information indicating the allocated multiplexing resources to the channel interface 305.

At step S805, the processor 300 command the transfer of symbols through the uplink channel if it is needed.

The symbols transferred are symbols comprised in the nominal part of the uplink sub frame and supplementary uplink symbols.

The channel interface 305 multiplexes each uplink symbol of the nominal part of the downlink sub frame transferred by the terminal TEi on allocated multiplexing resources.

The channel interface 305 multiplexes at least one supplementary uplink symbol transferred by the terminal TEi on the same multiplexing resources allocated by the base station for the BTSa for the symbols comprised in the nominal part of the uplink sub frame.

The multiplexing resources for the symbols comprised in the nominal part of the uplink sub frame and for the at least one supplementary symbol are weighted by the first transmission power coefficients or respectively by the first and second transmission power coefficients.

At next step S806 the processor 300 checks whether or not at least one pilot symbol needs to be received by the base station BTSa.

If at least one pilot symbol needs to be received, the processor 300 returns to step S801, otherwise, the processor 300 returns to step S802.

FIG. 9 is an example of the channel quality indication determined between the base station and each terminal according to the first and the second modes of realisation of the present invention.

On the vertical axis of the FIG. 9, the frequency band is shown and the horizontal axis represents the value of the channel quality indications determined by each terminal TEi and reported to the base station BTSa through the uplink channel in order to optimize the use of the downlink multiplexing resources.

In the FIG. 9, the curves of the channel quality indications determined by the terminals TE1 to TE3 are shown.

Such curves are used by the base station BTSa for allocating the multiplexing resources to the terminals TE1 to TE3.

For the uplink channels, the base station BTSa determines the channel quality indications on each uplink channel in order to optimize the use of the uplink multiplexing resources.

FIG. 10a is an example of the multiplexing resources of the wireless telecommunication system which are allocated in a first variant of realisation of the present invention to the terminals according to the first and second modes of realisation of the present invention.

According to the first variant, the first group comprises all the terminals TE and the at least one other group is a second group which comprises the terminals TE which can receive or transmit the maximum number of supplementary symbols.

The FIG. 10a discloses an example wherein four symbols are comprised in the nominal part of the downlink sub frame and two symbols are supplementary symbols.

The FIG. 10a represents a table of twelve lines noted 1001 to 1012 and six columns noted 1051 to 1056. Each line 1001 to 1012 represents a chunk of frequencies according to the first mode of realisation or a code according to the second mode of realisation, each column 1051 to 1056 represents a symbol. Such table is preferably generated for each sub frame.

It has to be noted here that a more important number of chunks of frequencies or codes can be allocated in the present invention or a reduced number of chunks of frequencies or codes can be allocated in the present invention.

The column 1051 represents the symbol s1, the column 1052 represents the symbol s2, the column 1053 represents the symbol s3, the column 1054 represents the symbol s4, the column 1055 represents the supplementary symbol s5 and the column 1056 represents the supplementary symbol s6.

The first group determined by the base station BTSa comprises the terminals TE1 to TE3 of which $n_{d1\,TEi}$ is equal to or upper than null value.

The base station BTSa allocates to the terminal TE1 the chunks of frequencies or the codes noted 1001 to 1003 and 1010 to 1012 for the symbols s1 to s4.

The base station BTSa allocates to the terminal TE2 the chunks of frequencies or the codes noted 1004 to 1006 for the symbols s1 to s4.

The base station BTSa allocates to the terminal TE3 the chunks of frequencies or the codes noted 1007 to 1009 for the symbols s1 to s4.

The base station BTSa allocates the same chunks of frequencies or codes to a terminal TEi for all of the symbols s1 to s4 comprised in the nominal part of the downlink sub frame of the FIG. 6.

The base station BTSa allocates to the terminal TE3, for the supplementary symbols s5 and s6, the multiplexing resources which have been allocated for the symbols comprised in the nominal part of the downlink sub frame to the terminals TE comprised in the first group. More precisely, all the chunks of frequencies or codes allocated to the terminals comprised in the first group are allocated for the symbols s5 and s6 to the terminal TE3 of which $n_{d1\,TEi}$ is equal to two.

FIG. 10b is an example of the multiplexing resources of the wireless telecommunication system which are allocated in a second variant of realisation of the present invention to the terminals according to the first and second modes of realisation of the present invention.

According to the second variant, the first group comprises all the terminals TE and at least two other groups are formed, at least a second group which comprises the terminals TE which can receive and/or transmit a first number of supplementary symbols and a third group which comprises the terminals TE which can receive and/or transmit a second number of supplementary symbols.

The FIG. 10b discloses an example wherein four symbols are comprised in the nominal part of the downlink sub frame and two symbols are supplementary symbols.

The FIG. 10b represents a table of twelve lines noted 1101 to 1112 and six columns noted 1151 to 1156. Each line 1101 to 1112 represents a chunk of frequencies according to the first mode of realisation or a code according to the second mode of realisation, each column 1151 to 1156 represents a symbol. Such table is preferably generated for each sub frame.

It has to be noted here that a more important number of chunks of frequencies or codes can be allocated in the present invention or a reduced number of chunks of frequencies or codes can be allocated in the present invention.

The column 1151 represents the symbol s1, the column 1152 represents the symbol s2, the column 1153 represents the symbol s3, the column 1154 represents the symbol s4, the column 1155 represents the supplementary symbol s5 and the column 1156 represents the supplementary symbol s6.

The first group determined by the base station BTSa comprises the terminals TE1 to TE3 of which $n_{d1\,TEi}$ is equal to or upper than null value.

The base station BTSa allocates to the terminal TE1 the chunks of frequencies or the codes noted 1101 to 1103 and 1110 to 1112 for the symbols s1 to s4.

The base station BTSa allocates to the terminal TE2 the chunks of frequencies or the codes noted 1104 to 1106 for the symbols s1 to s4.

The base station BTSa allocates to the terminal TE3 the chunks of frequencies or the codes noted 1107 to 1109 for the symbols s1 to s4.

The base station BTSa allocates the same chunks of frequencies or codes to a terminal TEi for all of the symbols s1 to s4 comprised in the nominal part Dref of the downlink sub frame according to the example of the FIG. 6.

The base station BTSa determines at least two other groups, at least a second group which comprises the terminals TE of which $n_{d1\,TEi}$ is equal to one, i.e. the terminal TE2 and a third group which comprises the terminals TE of which $n_{d1\,TEi}$ is equal to two, i.e. the terminal TE3.

The base station BTSa allocates to the terminal TE2, for the supplementary symbol s5, the multiplexing resources which have been allocated for the symbols comprised in the nominal part of the downlink sub frame to the terminals TE comprised in the first group. More precisely, all the chunks of frequencies or codes of the sub-frame are allocated for the symbol s5 to the terminal TE2.

The base station BTSa allocates to the terminal TE3, for the supplementary symbol s6, the multiplexing resources which have been allocated for the symbols comprised in the nominal part of the downlink sub frame to the terminals TE comprised in the first group. More precisely, the base station BTSa allocates all the chunks of frequencies or codes of the sub-frame for the symbol s6 to the terminal TE3.

FIG. 10c is an example of the multiplexing resources of the wireless telecommunication system which are allocated in a third variant of realisation to the terminals according to the first and second modes of realisation of the present invention of the present invention.

According to the third variant, the first group comprises a part of the terminals TE which can receive and/or transmit at most a first number of supplementary symbol during the time delay and at least two other groups are formed, at least a second group which comprises the terminals TE which can receive and/or transmit the first number of supplementary symbol and a third group which comprises the terminals TE which can receive and/or transmit a second number of supplementary symbols.

The FIG. 10c discloses an example wherein four symbols are comprised in the nominal part of the downlink sub frame and two symbols are supplementary symbols.

The FIG. 10c represents a table of twelve lines noted 1201 to 1212 and six columns noted 1251 to 1256. Each line 1201 to 1212 represents a chunk of frequencies according to the first mode of realisation or a code according to the second mode of realisation, each column 1251 to 1256 represents a symbol of the FIG. 6. Such table is preferably generated for each sub frame.

It has to be noted here that a more important number of chunks of frequencies or codes can be allocated in the present invention or a reduced number of chunks of frequencies or codes can be allocated in the present invention.

The column 1251 represents the symbol s1, the column 1252 represents the symbol s2, the column 1253 represents the symbol s3, the column 1254 represents the symbol s4, the column 1255 represents the supplementary symbol s5 and the column 1256 represents the supplementary symbol s6.

The first group determined by the base station BTSa comprises the terminals TE1 and TE2 of which $n_{d1TEi}$ is equal lower than or equal to one.

The base station BTSa allocates to the terminal TE1 the chunks of frequencies or the codes noted 1201 to 1203 and 1210 to 1212 for the symbols s1 to s4.

The base station BTSa allocates to the terminal TE2 the chunks of frequencies or the codes noted 1204 to 1209 for the symbols s1 to s4.

The base station BTSa allocates the same chunks of frequencies or codes to a terminal TEi for all of the symbols s1 to s4 comprised in the nominal part Dref of the FIG. 6.

The base station BTSa forms a second group which comprises the terminals TE of which $n_{d1TEi}$ is equal to one, i.e. the terminal TE2 and a third group which comprises the terminals TE of which $n_{d1TEi}$ is equal to two, i.e. the terminal TE3.

The base station BTSa allocates to the terminal TE2, for the supplementary symbol s5, the multiplexing resources which have been allocated for the symbols comprised in the nominal part of the downlink sub frame to the terminals TE comprised in the first group. More precisely, the base station BTSa allocates to the terminal TE2 all the chunks of frequencies or the codes of the sub-frame for the supplementary symbol s5. The base station BTSa allocates all the chunks of frequencies or codes of the sub-frame for the symbol s6 to the terminal TE3.

FIG. 10d is an example of the multiplexing resources of the wireless telecommunication system which are allocated in a fourth variant of realisation to the terminals according to the first and second modes of realisation of the present invention.

The FIG. 10d discloses an example wherein four symbols are comprised in the nominal part of the uplink sub frame and two symbols are supplementary uplink symbols.

The FIG. 10d represents a table of twelve lines noted 1301 to 1312 and six columns noted 1351 to 1356. Each line 1301 to 1312 represents a chunk of frequencies according to the first mode of realisation or a code according to the second mode of realisation, each column 1351 to 1356 represents a symbol. Such table is preferably generated for each sub frame.

It has to be noted here that a more important number of chunks of frequencies or codes can be allocated in the present invention or a reduced number of chunks of frequencies or codes can be allocated in the present invention.

The column 1351 represents the first symbol of the nominal part of the sub frame, the column 1352 represents the second symbol of the nominal part of the sub frame, the column 1353 represents the third symbol of the nominal part of the sub frame, the column 1354 represents the fourth symbol of the nominal part of the sub frame, the column 1355 represents the first supplementary symbol and the column 1356 represents the second supplementary symbol.

The first group determined by the base station BTSa comprises the terminals TE1 to TE3 of which $n_{d1TEi}$ is equal to or upper than null value.

The base station BTSa allocates to the terminal TE1 the chunks of frequencies or the codes noted 1301 to 1303 and 1310 to 1312 for the symbols of the nominal part of the sub frame.

The base station BTSa allocates to the terminal TE2 the chunks of frequencies or the codes noted 1304 to 1306 for the symbols of the nominal part of the sub frame.

The base station BTSa allocates to the terminal TE3 the chunks of frequencies or the codes noted 1307 to 1309 for the symbols of the nominal part of the sub frame.

The base station BTSa allocates to a terminal TEi the same chunks of frequencies or codes for all of the symbols comprised in the nominal part of a sub frame and for the supplementary uplink or downlink symbols if they are some.

The base station BTSa allocates to the terminal TE2, for the first supplementary symbol, the multiplexing resources which have been allocated for the symbols comprised in the nominal part of the downlink and/or uplink sub frame to the terminal TE2.

The base station BTSa allocates to the terminal TE3, for the supplementary symbols, the multiplexing resources which have been allocated for the symbols comprised in the nominal part of the downlink and/or uplink sub frame to the terminal TE3.

FIG. 10e is an example of the multiplexing resources of the wireless telecommunication system which are allocated in a fifth variant of realisation to the terminals according to the first and second modes of realisation of the present invention.

The FIG. 10e represents a table of twelve lines noted 1401 to 1412 and six columns noted 1451 to 1456. Each line 1401 to 1412 represents a chunk of frequencies according to the first mode of realisation or a code according to the second mode of realisation, each column 1451 to 1456 represents a symbol. Such table is preferably generated for each sub frame.

It has to be noted here that a more important number of chunks of frequencies or codes can be allocated in the present invention or a reduced number of chunks of frequencies or codes can be allocated in the present invention.

The column 1451 represents the symbol s1, the column 1452 represents the symbol s2, the column 1453 represents the symbol s3, the column 1454 represents the symbol s4, the column 1455 represents the supplementary symbol s5 and the column 1456 represents the supplementary symbol s6.

The first group determined by the base station BTSa comprises the terminals TE1 to TE3 of which $n_{d1TEi}$ is equal to or lower than a first value, as example the value one.

The base station BTSa allocates to the terminal TE1 the chunks of frequencies or the codes noted 1401 to 1403 and 1410 to 1412 for the symbols s1 to s4.

The base station BTSa allocates to the terminal TE2 the chunks of frequencies or the codes noted 1404 to 1409 for the symbols s1 to s4.

The base station BTSa allocates to a terminal TEi the same chunks of frequencies or codes for all of the symbols s1 to s4 comprised in the nominal part of a sub frame.

The base station BTSa allocates to the terminal TE2, for the supplementary symbol s5, the multiplexing resources 1401 to 1406.

The base station BTSa allocates to the terminal TE3, for the supplementary symbol s5, the multiplexing resources 1407 to 1412.

The base station BTSa allocates to the terminal TE3, for the supplementary symbol s6, the multiplexing resources 1401 to 1412.

FIG. 11a is an example of the transmission power of the data multiplexed on the multiplexing resources for the symbols comprised in the nominal part of a sub frame.

On the vertical axis of the FIG. 11a, different multiplexing resources MXR1 to MXR4 are shown.

The multiplexing resources MXR1 correspond to the multiplexing resources 1001 to 1003 of the FIG. 10a, or correspond to the multiplexing resources 1101 to 1103 of the FIG. 10b, or correspond to the multiplexing resources 1201 to 1203 of the FIG. 10c, or correspond to the multiplexing resources 1301 to 1303 of the FIG. 10d, or correspond to the multiplexing resources 1401 to 1403 of the FIG. 10e, or correspond to the Beam1 of the FIG. 12.

The multiplexing resources MXR2 correspond to the multiplexing resources 1004 to 1006 of the FIG. 10a, or correspond to the multiplexing resources 1104 to 1106 of the FIG. 10b, or correspond to the multiplexing resources 1204 to 1206 of the FIG. 10c, or correspond to the multiplexing resources 1304 to 1306 of the FIG. 10d, or correspond to the multiplexing resources 1404 to 1406 of the FIG. 10e, or correspond to the Beam2 of the FIG. 12.

The multiplexing resources MXR3 correspond to the multiplexing resources 1007 to 1009 of the FIG. 10a, or correspond to the multiplexing resources 1107 to 1109 of the FIG. 10b, or correspond to the multiplexing resources 1207 to 1209 of the FIG. 10c, or correspond to the multiplexing resources 1307 to 1309 of the FIG. 10d, or correspond to the multiplexing resources 1407 to 1409 of the FIG. 10e, or correspond to the Beam3 of the FIG. 12.

The multiplexing resources MXR4 correspond to the multiplexing resources 1010 to 1012 of the FIG. 10a, or correspond to the multiplexing resources 1110 to 1112 of the FIG. 10b, or correspond to the multiplexing resources 1210 to 1212 of the FIG. 10c, or correspond to the multiplexing resources 1310 to 1312 of the FIG. 10d, or correspond to the multiplexing resources 1410 to 1412 of the FIG. 10e, or correspond to the Beam4 of the FIG. 12.

On the horizontal axis of the FIG. 11a, different transmission power are shown.

The transmission power P1 corresponds to the transmission power of the data multiplexed on the multiplexing resources MXR1 and MXR4.

The transmission power P2 corresponds to the transmission power of the data multiplexed on the multiplexing resources MXR2.

The transmission power P3 corresponds to the transmission power of the data multiplexed on the multiplexing resources MXR3.

The transmission power are for the multiplexing resources of symbols comprised in the nominal part of a downlink sub frame or an uplink sub frame.

The processor 200 determines periodically or on demand or for each downlink or uplink sub frame, and for each multiplexing resource, the transmission power P1 P2 and P3 for the multiplexing resources MXR1 to MXR4 of the symbols transferred through each downlink channel Ch1 to Ch3.

For that, the processor 200 uses the channel quality indication determined by each terminal TEi as the one disclosed in the FIG. 9 or 12 and/or takes also into account the distance separating each terminal TEi from the base station BTSa and/or takes into account interferences generated in the neighbour coverage areas 15b and 15c.

FIG. 11b is an example of the transmission power of the data multiplexed on the multiplexing resources for at least one supplementary symbol.

According to the invention, the transmission power of the data multiplexed on the multiplexing resources for the supplementary downlink symbols is the same as one used for transferring data multiplexed on the multiplexing resources for the symbols comprised in the nominal part of the downlink sub frame and/or the transmission power of the data multiplexed on the multiplexing resources for the supplementary uplink symbols is the same as one used for transferring the data multiplexed on the multiplexing resources for the symbols comprised in the nominal part of the uplink sub frame.

Each second transmission power coefficient associated to a multiplexing resource is equal to the first transmission power coefficient associated to the same multiplexing resource as the second transmission power coefficient, i.e. the power coefficient P1' is equal to the power coefficient P1 of the FIG. 11a, the power coefficient P2' is equal to the power coefficient P2 of the FIG. 11a and the power coefficient P3' is equal to the power coefficient P3 of the FIG. 11a.

According to a variant, each second transmission power coefficient associated to a multiplexing resource is lower than the first transmission power coefficient associated to the same multiplexing resource as the second transmission power coefficient, i.e. the power coefficient P1' is lower than the power coefficient P1 of the FIG. 11a, the power coefficient P2' is lower than the power coefficient P2 of the FIG. 11a and the power coefficient P3' is lower than the power coefficient P3 of the FIG. 11a.

According to another variant, each second transmission power coefficient associated to a multiplexing resource is equal to the lowest first transmission power coefficient. i.e. the power coefficients P1' P2' and P3' are equal and equal to the power coefficient P3 of the FIG. 11a.

FIG. 12 is an example of the channel quality indication determined between the base station and each terminal according to the third mode of realisation of the present invention.

On the vertical axis of the FIG. 12, the different beams Beam1 to Beam4 are shown and the horizontal axis represents the value of the channel quality indications determined by each terminal TEi and reported to the base station BTSa through the uplink channel in order to optimize the use of the downlink multiplexing resources.

In the FIG. 12, the curves of the channel quality indications determined by the terminals TE1 to TE3 are shown.

Such curves are used by the base station BTSa for allocating the multiplexing resources to the terminals TE1 to TE3.

For the uplink channels, the base station BTSa determines the channel quality indications on each uplink channel in order to optimize the use of the uplink multiplexing resources.

FIG. 13 is an example of the multiplexing resources of the wireless telecommunication system which are allocated according to the present invention to the terminals according to the third mode of realisation of the present invention.

The FIG. 13 discloses an example wherein four symbols are comprised in the nominal part of the downlink sub frame and two symbols are supplementary symbols.

The FIG. 13 represents a table of four lines noted 130 to 133 and six columns noted 134 to 139. Each line 130 to 133 represents a beam or an area in which signals are directed by the base station BTSa according to the third mode of realisation, each column 135 to 139 represents a symbol of the FIG. 6. Such table is preferably generated for each sub frame.

The column 134 represents the symbol s1, the column 135 represents the symbol s2, the column 136 represents the symbol s3, the column 137 represents the symbol s4, the column 138 represents the supplementary symbol s5 and the column 139 represents the supplementary symbol s6.

The first group determined by the base station BTSa comprises the terminals TE1, TE2 and TE3 of which $n_{d1\,TEi}$ is equal to or upper than null value.

The base station BTSa allocates to the terminal TE1 the Beam1 and the Beam2 noted 130 and 131 for the symbols s1 to s4.

The base station BTSa allocates to the terminal TE2 the Beam3 noted 132 for the symbols s1 to s4.

The base station BTSa allocates to the terminal TE3 the Beam4 noted 133 for the symbols s1 to s4.

The base station BTSa forms a second group which comprises the terminals TE of which $n_{d1\,TEi}$ is equal to one, i.e. the terminal TE2 and a third group which comprises the terminals TE of which $n_{d1\,TEi}$ is equal to two, i.e. the terminal TE3.

The base station BTSa allocates to the terminal TE2, for the supplementary symbol s5, the multiplexing resources which have been allocated for the symbols comprised in the nominal part of the downlink sub frame to the terminals TE comprised in the first group. More precisely, the base station BTSa allocates to the terminal TE2 all the beams 130 to 133 of the sub-frame for the supplementary symbol s5. The base station BTSa allocates all the beams 130 to 133 of the sub-frame for the supplementary symbol s6 to the terminal TE3.

It has to be noted here that the different allocation schemes shown in reference to the FIG. 10 in the first and second modes of realisation of the present invention are also applicable to the third mode of realisation.

FIGS. 14a and 14c show control information which convey information indicating the allocated multiplexing resources according to the present invention which are transferred by the base station to terminals.

The FIG. 14a discloses an example of the control information which convey information indicating the allocated multiplexing resources for terminals belonging to the first group.

The FIG. 14a discloses an example wherein four symbols are comprised in the nominal part of the downlink sub frame and two symbols are supplementary symbols.

The control information is preferably multiplexed with other data in order to form one symbol, as example the first symbol s1, comprised in the nominal part of the downlink sub frame or is multiplexed with other data in order to form at least a part of the symbols, s1 to s4 according to the example of the FIG. 6, comprised in the nominal part of the downlink sub frame.

The control information comprises as many lines as there are multiplexing resources. The column 141 comprises the identifier of each multiplexing resource and the column 142 comprises the short identifier of the terminal TEi to which the multiplexing resource identified in the same line is allocated.

A short identifier is a binary sequence which replaces the identifier of a terminal TEi for at least one sub frame.

The FIG. 14b is a correspondence table which shows the correspondence between the short identifier of each terminal to which multiplexing resources are allocated and the identifier of the terminal.

The FIG. 14b discloses an example wherein four symbols are comprised in the nominal part of the downlink sub frame and two symbols are supplementary symbols.

The correspondence table is determined at each sub frame and transferred through the downlink channels to the terminals TE. The correspondence table comprises as many lines as there are terminals TE to which multiplexing resources are allocated.

According to the example of the FIG. 1, as only three terminals TE are comprised in the coverage area 15a multiplexing resources are allocated to each terminal TEi, each short identifier consists in a sequence of two bits. "01" identifies the terminal TE1, "10" identifies the terminal TE2, and "11" identifies the terminal TE3.

Referring to the example of the FIG. 14b, the multiplexing resources noted "1" to "3" and "10" to "12" are allocated to the terminal TE1, the multiplexing resources noted "4" to "6" are allocated to the terminal TE2, the multiplexing resources noted "7" to "9" are allocated to the terminal TE3.

According to the first and second modes of realisation of the present invention, the multiplexing resources 1 to 12 correspond respectively to the chunks of frequencies 1001 to 1012 of the FIG. 10a, 1101 to 1112 of the FIG. 10b and 1201 to 1212 of the FIG. 10c.

The FIG. 14c discloses an example of the control information which convey information indicating the allocated multiplexing resources for terminals belonging to the other group.

The FIG. 14c discloses an example wherein two symbols are supplementary symbols.

The control information is preferably multiplexed with other data in order to form at least one symbol, comprised in the nominal part of the downlink sub frame or is preferably multiplexed with other data in order to form at least one supplementary symbol.

The control information comprises as many lines as there are multiplexing resources. The column 143 comprises the identifier of each multiplexing resource and the column 144 comprises the short identifier of the terminal TEi to which the multiplexing resource identified in the same line is allocated for the first supplementary symbol and the column 145 comprises the short identifier of the terminal TEi to which the multiplexing resource identified in the same line is allocated for the second supplementary symbol.

Referring to the example of the FIG. 14c, the multiplexing resources noted "1" to "6" are allocated to the terminal TE2 for the first supplementary symbol, the multiplexing resources noted "7" to "12" are allocated to the terminal TE3 for the first supplementary symbol and the multiplexing resources noted "1" to "12" are allocated to the terminal TE3 for the second supplementary symbol, Naturally, many modifications can be made to the embodiments of the invention described above without departing from the scope of the present invention.

The invention claimed is:

1. A transmission method in a wireless telecommunication system including at least a base station to communicate with terminals over bidirectional communication channels, each channel supporting frames being divided into downlink sub frames and uplink sub frames, each downlink sub frame including a number of symbols to be transmitted to at least two terminals, wherein a time delay of each terminal connected thereto is determined, said time delay being such that any terminal after having received all the symbols included in a downlink sub frame followed by an uplink sub frame may transmit other symbols over said uplink sub frame with said time delay so that the other symbols susceptible to be transmitted are received by said base station at a time separated from an end of a transmission by the base station of the downlink sub frame by a predefined guard period that is constant regardless of distance, and wherein a transfer of at least one supplementary symbol between the base station and at least one terminal that can receive or transmit said at least one supplementary symbol during the time delay is enabled, the method comprising:

obtaining multiplexing resources of the wireless telecommunication system for transfer of at least a part of the symbols comprised in a sub frame;

associating with a first portion of each obtained multiplexing resource one first transmission power coefficient of a plurality of first transmission power coefficients;

multiplexing data on the first portion of each obtained multiplexing resource in order to form at least a part of each symbol included in the sub frame;

transferring, during a first time period that precedes the guard period, the at least part of each symbol comprised in the sub frame according to a first group of transmission power coefficients of the plurality of first transmission power coefficients that correspond to the at least part of each symbol;

multiplexing data on a second portion of each obtained multiplexing resource in order to form at least a part of at least one supplementary symbol;

associating with the second portion of each obtained multiplexing resource one second transmission power coefficient of a plurality of second transmission power coefficients; and transferring, during the guard period that follows the first time period, the at least part of the at least one supplementary symbol according to a second group of transmission power coefficients of the plurality of second transmission power coefficients that correspond to the at least part of the at least one supplementary symbol, each second transmission power coefficient associated with a multiplexing resource being lower than the first transmission power coefficient associated with a same multiplexing resource as the second transmission power coefficient.

2. The method according to claim 1, wherein the multiplexing resources of the wireless telecommunication system are at least one of chunks of frequencies, codes, and areas of a coverage area of the base station.

3. The method according to claim 1 or 2, wherein each second transmission power coefficient associated with a multiplexing resource is lower than the first transmission power coefficient associated with a same multiplexing resource as the second transmission power coefficient.

4. The method according to claim 1 or 2, wherein each second transmission power coefficient associated with a multiplexing resource is equal to a lowest first transmission power coefficient.

5. The method according to claim 1, wherein the method is executed by the base station.

6. The method according to claim 5, wherein the multiplexing resources are obtained by analyzing channel conditions, which exist between the base station and each terminal connected to the base station, and the base station allocates the multiplexing resources of the wireless telecommunication system to at least two terminals for demultiplexing of the symbols comprised in the sub frame.

7. The method according to claim 6, wherein a first control information is transferred to the terminals indicating the multiplexing resources to be used by the terminals for the demultiplexing of the symbols comprised in the sub frame.

8. The method according to claim 7, wherein a second control information is transferred to the terminals indicating if multiplexing resources are allocated to at least one terminal for the demultiplexing of the at least one supplementary symbol.

9. The method according to claim 8, wherein the first control information is multiplexed with data in order to form at least one symbol comprised in the sub frame and the second control information is multiplexed with data in order to form at least one transferred symbol.

10. The method according to claim 9, further comprising:

determining, a number of supplementary symbols that can be received or transmitted by each terminal; and forming a first group of terminals and at least another group of at least one terminal, the first group of terminals comprising at least terminals that can not receive and/or transmit said at least one supplementary symbol during the time delay, the other group of at least one terminal comprising at least a terminal that can receive and/or transmit said at least one supplementary symbol during the time delay.

11. The method according to claim 10, wherein the first group comprises all the terminals and the at least one other group is a second group that comprises the terminals that can receive and/or transmit a maximum number of supplementary symbols.

12. The method according to claim 11, wherein the second control information comprises, for each terminal, at least a field that indicates if all the multiplexing resources allocated to the terminals comprised in the first group are allocated to the terminal for all the supplementary symbols.

13. The method according to claim 10, wherein the first group comprises all the terminals and plural other groups are formed, including at least a second group, which comprises the terminals that can receive and/or transmit a first number of supplementary symbols, and at least a third group, which comprises the terminals that can receive and/or transmit a second number of supplementary symbols.

14. The method according to claim 10, wherein the first group comprises a part of the terminals that can receive and/or transmit at most a first number of supplementary symbols during the time delay, and plural other groups are formed, including at least a second group that comprises the terminals that can receive and/or transmit the first number of supplementary symbols, and a third group that comprises the terminals that can receive and/or transmit a second number of supplementary symbols.

15. The method according to claim 1, wherein the method is executed by a terminal.

16. The method according to claim 15, further comprising:

receiving a downlink sub frame from the base station and obtaining the multiplexing resources by reading a control information, which is multiplexed with data in order to form at least one symbol comprised in the received downlink sub frame.

17. The method according to claim 16, wherein information representative of each first transmission power coefficient is included in the received downlink sub frame.

18. The method according to claim 16, wherein information representative of each second transmission power coefficient is included in the received downlink sub frame.

19. A transmission device in a wireless telecommunication system including at least a base station to communicate with terminals over bidirectional communication channels, each channel supporting frames being divided into downlink sub frames and uplink sub frames, each downlink sub frame including a number of symbols to be transmitted to at least two terminals, wherein a time delay of each terminal connected thereto is determined, said time delay being such that any terminal after having received all the symbols included in a downlink sub frame followed by an uplink sub frame may transmit other symbols over said uplink sub frame with said time delay so that the other symbols susceptible to be transmitted are received by said base station at a time separated from an end of a transmission by the base station of the downlink sub frame by a predefined guard period that is constant regardless of distance, and wherein a transfer of at least one supplementary symbol between the base station and at least one terminal that can receive or transmit said at least one supplementary symbol during the time delay is enabled, the transmission device comprising:

- means for obtaining multiplexing resources of the wireless telecommunication for transfer of at least a part of the symbols comprised in a sub frame;
- means for associating with a first portion of each obtained multiplexing resource one first transmission power coefficient of a plurality of first transmission power coefficients;
- means for multiplexing data on the first portion of each obtained multiplexing resource in order to form at least a part of each symbol included in the sub frame;
- means for transferring, during a first time period that precedes the guard period, the at least part of each symbol comprised in the sub frame according to a first group of transmission power coefficients of the plurality of first transmission power coefficients that correspond to the at least part of each symbol;
- means for multiplexing data on a second portion of each obtained multiplexing resource in order to form at least a part of at least one supplementary symbol;
- means for associating with the second portion of each obtained multiplexing resource one second transmission power coefficient of a plurality of second transmission power coefficients; and
- means for transferring, during the guard period that follows the first time period, the at least part of the at least one supplementary symbol according to a second group of transmission power coefficients of the plurality of second transmission power coefficients that correspond to the at least part of the at least one supplementary symbol, each second transmission power coefficient associated with a multiplexing resource being lower than the first transmission power coefficient associated with a same multiplexing resource as the second transmission power coefficient.

20. The device according to claim 19, wherein the device is the base station or a terminal.

21. A non-transitory computer-readable medium encoded with computer instructions, which cause a programmable device to execute the steps of the method according to claim 1, when said computer instructions are executed on the programmable device.

* * * * *